United States Patent
Akenine-Moller et al.

(10) Patent No.: US 9,251,731 B2
(45) Date of Patent: Feb. 2, 2016

(54) MULTI-SAMPLING ANTI-ALIASING COMPRESSION BY USE OF UNREACHABLE BIT COMBINATIONS

(71) Applicants: Tomas G. Akenine-Moller, Lund (SE); Prasoonkumar Surti, Folsom, CA (US); Carl J. Munkberg, Malmö (SE)

(72) Inventors: Tomas G. Akenine-Moller, Lund (SE); Prasoonkumar Surti, Folsom, CA (US); Carl J. Munkberg, Malmö (SE)

(73) Assignee: INTEL CORPORATION, Santa Clara, CA (US)

( * ) Notice: Subject to any disclaimer, the term of this patent is extended or adjusted under 35 U.S.C. 154(b) by 144 days.

(21) Appl. No.: 13/891,504

(22) Filed: May 10, 2013

(65) Prior Publication Data

US 2014/0333662 A1   Nov. 13, 2014

(51) Int. Cl.
*G09G 3/20* (2006.01)
*G06T 11/20* (2006.01)

(52) U.S. Cl.
CPC .............. *G09G 3/2003* (2013.01); *G06T 11/20* (2013.01); *G06T 2200/12* (2013.01)

(58) Field of Classification Search
None
See application file for complete search history.

(56) References Cited

U.S. PATENT DOCUMENTS

| | | | | |
|---|---|---|---|---|
| 6,535,218 B1 * | 3/2003 | Schlapp | ............. | G06T 1/60 345/545 |
| 7,126,615 B2 | 10/2006 | Liao | | |
| 7,868,901 B1 * | 1/2011 | Edmondson | ............ | G06T 11/40 345/422 |
| 8,063,914 B1 * | 11/2011 | Miller | ............. | G06T 15/503 345/581 |
| 2004/0161146 A1 * | 8/2004 | Van Hook | ............. | H04N 1/644 382/166 |
| 2006/0103658 A1 * | 5/2006 | Liao | ............. | G09G 5/022 345/545 |
| 2009/0091577 A1 * | 4/2009 | Brothers | ............ | G06T 1/20 345/506 |
| 2009/0256848 A1 * | 10/2009 | Iourcha | ............. | G06T 5/00 345/522 |

OTHER PUBLICATIONS

International Search Report and Written Opinion for PCT/US2014/035453, mailed Aug. 21, 2014, 10 pages.

* cited by examiner

*Primary Examiner* — Xiao Wu
*Assistant Examiner* — Jitesh Patel
(74) *Attorney, Agent, or Firm* — Lynch Law Patent Group, PC

(57) ABSTRACT

Techniques related to graphics rendering including techniques for improved multi-sampling anti-aliasing compression by use of unreachable bit combinations as described.

24 Claims, 10 Drawing Sheets

500

Determine, for Individual Pixels of a Tile Of Pixels, Bit Combinations that Indicate Color Planes for Color Samples of the Individual Pixels

502

Transform a Bit Combination to an Unreachable Bit Combination that Indicates a Characteristic Associated with a Color Plane

504

MULTI-SAMPLING ANTI-ALIASING COMPRESSION BY USE OF UNREACHABLE BIT COMBINATIONS

BACKGROUND

In general, graphics rendering may generate an image or images from model data using a wide range of computer implemented techniques. In some graphics rendering implementations, multi-sampling anti-aliasing (MSAA) techniques may be used to improve the visual quality of the rendered image(s) using, in some examples, a graphics processor. For example, MSAA techniques may reduce or eliminate jagged edge effects in images and crawling effects in video. In MSAA, multiple visibility samples, color samples, and/or depth samples may be used per pixel. Such oversampling or super-sampling (e.g., using more than one sample per pixel) and subsequent sample reduction to produce a final image may improve image or video quality. In general, an advantage of MSAA is that although there are multiple samples per pixel, the pixel shader (e.g., a program that provides shading within an image) only needs to be evaluated once per pixel per primitive. A common case is 4×MSAA, where there are four samples per pixel (e.g., 4× samples per pixel) as compared to the usual case of one sample per pixel.

In general, using MSAA requires a color buffer bandwidth increase by a factor of N for N×MSAA. Therefore, compression of MSAA color data may be advantageous. In previous implementations, the colors may be split into N different planes, such that plane 0 is filled first and subsequent planes are used or filled as needed. For example, if all of the samples in a pixel are the same color, then that pixel only fills color plane 0. If the samples of a pixel include two colors, planes 0 and 1 are utilized, and, in general, if the samples of a pixel include N colors, planes 0 through N−1 are utilized. Furthermore, if each pixel in a tile of pixels, for example, uses only one color each (though the colors between pixels may be different), then only plane 0 may be used for the tile of pixels. However, if one pixel of the tile includes two colors (for the samples of that pixel), then plane 1 must be used. If one more pixels use two colors (and no pixels use more than two colors), plane 0 and plane 1 are sufficient, but if one (or more) pixels uses three colors (and no pixels use more than three colors), plane 0/1/2 must be used, and so on. In such a manner the color planes may be populated as needed based on the samples within each pixel of a tile of pixels.

Furthermore, in general, each color sample within a pixel needs $\log_2(N)$ bits to index to a color in the N different planes (e.g., for 4 color planes, 2 index bits, are needed for each color sample). For example, if two color planes (planes 0 and 1) are used, for each color sample within a pixel, an index must be used to indicate the plane on which the color resides for that sample. In the case of 4×MSAA, each sample would need 2 index bits to point to a color being located in one of the (up to) 4 planes. For a tile of 8×4 pixels with 4 samples per pixel, the requirement is 2×8×4×4=256 bits for the index bits.

In general, if a pixel is completely inside a triangle being rendered, then all samples within the pixel will have the same color and the index or pointer bits will all be zeros for that pixel (because they will point to color plane 0 and index bits 00 point to color plane 0, for example). Furthermore, nothing will be stored in the remaining color planes for that pixel as described above. Therefore, in some cases, only plane 0 is needed. In such examples, compression of color plane 0 may be advantageous. Remaining color planes may be used more frequently as the complexity of the geometry being rendering into a tile (e.g., a tile of 8×4 pixels) increases. Tests on tessellated workloads indicate that higher level color planes are frequently used such that compression of planes 1, 2, and 3 may also save significant bandwidth.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Furthermore, where considered appropriate, reference labels have been repeated among the figures to indicate corresponding or analogous elements. In the figures.

DETAILED DESCRIPTION

Figure 1:
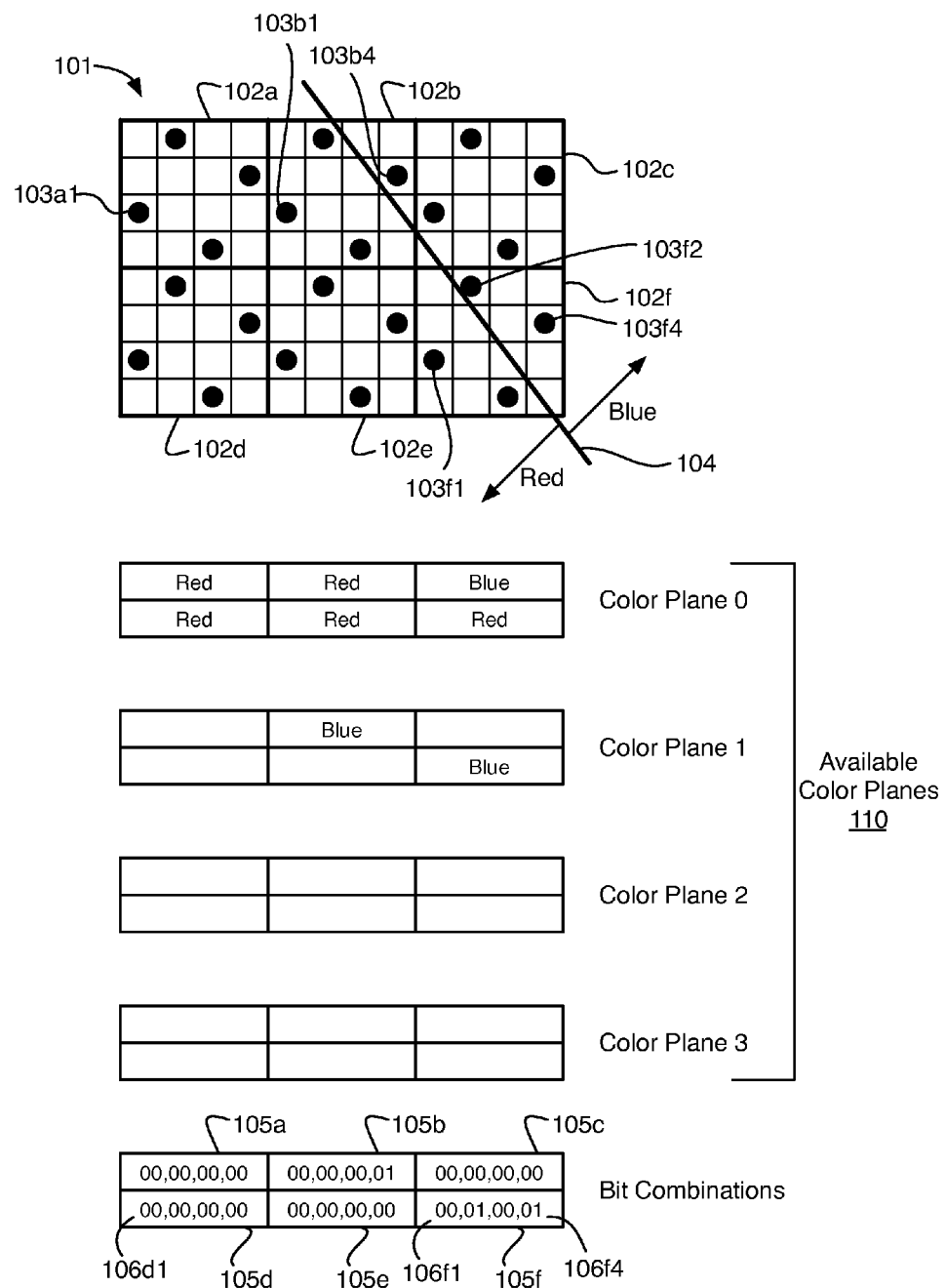
FIG. 1 is an illustrative diagram of an example process for determining bit combinations.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Furthermore, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Furthermore, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to graphics rendering including techniques for improved multi-sampling anti-aliasing compression by use of unreachable bit combinations.

As described above, multi-sampling anti-aliasing (MSAA) techniques may be used to improve the visual quality of rendered images and/or video using a graphics processor, for example. In MSAA, multiple visibility samples, color samples, and/or depth samples may be used per pixel. In some examples, 4×MSAA may be used, where there are four times as many samples per pixel as compared to the usual case of one sample per pixel. However, in other examples, 8×MSAA or 16×MSAA or any other number of samples may be used. Also as discussed, if a pixel is completely inside a triangle being rendered, then all color samples within the pixel will have the same color and the index bits (e.g., bits which indicate a color plane for a color sample) may be all zeroes for that pixel (because they will point to color plane 0). Furthermore, nothing will be stored in the remaining color planes for that pixel. In many cases, only plane 0 may be needed for a tile of pixels. Using such a scheme is a generally a type of compression. However, in such cases, it may also be advantageous to compress plane 0 using data compression techniques. Furthermore, remaining planes may be used more often as the complexity of the geometry that is being rendering into a tile increases. In such cases, compression of color planes 1, 2, and/or 3 may save significant bandwidth while transferring and/or storing graphics data in a computer system, for example.

As will be described in greater detail below, bit combinations may be determined for individual pixels of a tile of pixels. For example, for an 8×4 tile of 32 pixels, 32 bit combinations (one bit combination for each pixel) may be determined. The bit combinations may include a bit symbol (e.g., index bits) for each color sample of the pixel. For example, if an individual pixel includes 4 samples, a bit combination may include 4 bit symbols (one bit symbol for each color sample of the pixel). In general, each bit combination may represent the total number of index bits for all samples in the pixel, ordered in a sequence. For example, for 4×MSAA, there may be eight bits (e.g., two bits for each sample). For example, 8×MSAA, each bit combination may include 24 bits (e.g., three bits per sample), and so on. In general, the greater number of samples, the greater number of unreachable bit combinations (e.g., 8×MSAA has more unreachable bit combinations that 4×MSAA, 16×MSAA has more than 8×MSAA, and so on). Each bit symbol may indicate or "point to" a color plane associated with the color sample such that the indicated color plane may be one of one or more color planes (e.g., populated color planes). In general, a populated color plane may be a color plane having one or more colors populated therein and an available color plane may be a color plane available for population using a certain MSAA scheme. For example, if 4 color planes are available for use (e.g., in 4×MSAA), a 2 bit symbol may indicate which populated color plane of the 4 available color planes contains the color for a given color sample of a given pixel. The available color planes may be labeled 0 to 3 (continuing the example of 4 color planes) and the bit symbol 00 may indicate color plane 0, the bit symbol 01 may indicate color plane 1, the bit symbol 10 may indicate color plane 2, and the bit symbol 11 may indicate color plane 3, for example. In some examples, the bit symbols may be ordered in a left to right manner for the samples within a pixel to generate a bit combination for the pixel. However, any order of bit symbols may be used as long as, in general, the same order is used all the time, and there is a 1-1 mapping between the samples and the bit symbols.

As discussed, compressing one or more color planes may save significant bandwidth while transferring or storing color data in various computer implementations. However, compression may not be used in every instance and, in general, it may be advantageous to indicate whether a color plane has been compressed and/or which one or more of several color planes have been compressed. As will be described in greater detail below, one or more of the determined bit combinations may be transformed to an unreachable bit combination. The unreachable bit combination may indicate whether a color plane has been compressed and/or which one or more of several color planes have been compressed. Although discussed with respect to a compression state of a color plane, in general, the unreachable bit combination may indicate any characteristic associated with at least one color plane and the techniques described herein are not limited to a compression state of a color plane. In various examples, the characteristic may indicate a compression state of a color plane, a compression type of a color plane, whether a color plane includes cleared color samples, or the like.

As used herein, the term "unreachable bit combination" or "unreachable" generally refers to a bit combination or other data structure that may not be reached in a standard implementation of MSAA (i.e., unreachable using previous techniques). An "unreachable bit combination" may therefore be implemented or utilized to indicate additional characteristics (in some examples, a compression state) without losing information relative to the bit combination indicating a color plane or color planes, as is discussed below in various examples.

FIG. 1 is an illustrative diagram of an example process for determining bit combinations, arranged in accordance with at least some implementations of the present disclosure. As shown, a tile 101 may include multiple pixels 102a-102f. In general, a tile may include any number of pixels. In some examples, tile 101 may be 8 pixels wide by 4 pixels high (and may therefore include 32 pixels). In FIG. 1, tile 101 includes 6 pixels (3 pixels wide by 2 pixels high) for the sake of clarity of presentation. As shown, each of pixels 102a-102f may include color samples 103 such as color sample 103a1. In general, each of pixels 102a-102f may include any number of color samples 103 (e.g., two or more color samples) such as 4 color samples, as shown. FIG. 1 also illustrates a color boundary 104. Color boundary 104 may be a boundary between two triangles that are being rendered, for example. The entirety of the two triangles is not shown for the sake of clarity of presentation. In general, the rendering of the triangles separated by color boundary 104 may be performed by a graphics processing unit based on image data received from a memory store, as is discussed herein. As shown, in the illustrated example, the area to the left of color boundary 104 may be Red and the area to the right of color boundary 104 may be Blue.

In general, any number of color boundaries separating any variety of implemented colors may be included in the rendering of a tile such that a large number of combinations of colors for color samples 103 are available. For example, as illustrated at pixel 102a, each color sample within a pixel may have the same color (e.g., Red). In other examples, as illustrated at pixel 102b, a pixel may include color samples with two colors (e.g., color sample 103b1 is Red and color sample 103b4 is Blue). In other examples, a pixel may have color samples with three colors or four colors (the maximum for the illustrated example) or more (in examples with additional color samples). Additional examples include an entire tile having only one color, a tile having different colors across pixels, a tile having different colors across color samples, and so on.

FIG. 1 also illustrates four available color planes 110: color plane 0, color plane 1, color plane 2, and color plane 3. In general, any number of color planes may be used and/or available in the implementations of the techniques discussed herein. In some examples, four color planes may be used with respect to four color samples per pixel. Such implementations may correspond to 4×MSAA techniques, for example. As discussed, in other examples, 8×MSAA or 16×MSAA or any other number of samples may be used. As shown, although some color planes may be available some may not be used for a given tile (e.g., in FIG. 1, color plane 2 and color plane 3 are available but unused). In general, a color plane that is in use may be described as a populated color plane. As shown, color plane 0 may be first populated with one or more colors. For example, for pixel 102a, color plane 0 may be populated with the color associated with color sample 103a1 (Red). Similarly, color plane 0 may be populated for the first color samples of pixels 102b-f. In some examples, color plane 0 may be populated with the furthest left color sample for each pixel although, in general, any location may be used as a first color sample for color plane 0.

As is also shown in FIG. 1, color planes 1, 2, and 3 are not populated for pixel 102a since each color sample 103a of pixel 102a matches the color of color sample 103a1 (Red). Similarly, color planes 1, 2, and 3 are not populated for pixels 102c, 102d, and 102e in the given example. For pixel 102b, color plane 0 is populated with Red, the color associated with color sample 103b1 as shown (Red is also associated with color samples 103b2 and 103b3, which are not labeled for clarity). Also as shown, color sample 103b4 of pixel 102b is associated with Blue, which is populated in color plane 1. As shown, pixel 102b does not require color plane 2 or color plane 3 to be populated (as none of the illustrated pixels do since only two colors and one color boundary 104 are used in the illustrated example). Pixel 102f similarly requires populating color planes 0 and 1 for color sample 103f1 (Red) and color sample 103f2 (Blue). Therefore, the given example, color plane 0 and color plane 1 may be considered populated color planes. As will be appreciated, any number of color planes for any number of samples for any size of tile of pixels may be populated in a similar manner using the described techniques. As will also be appreciated, a wide range of colors, color samples, pixels, and color planes may be available using the described techniques.

FIG. 1 also illustrates bit combinations 105a-105f associated with pixels 102a-102f and color samples 103. In general, each bit combination includes bit symbols 106 as illustrated with respect to bit combination 105d having bit symbols 106d1, 106d2, 106d3, and 106d4 (only 106d1 is labeled for the sake of clarity of presentation). In general, each bit symbol 106 is associated with a color sample 103 such that each bit symbol 106 indicates or "points to" a color plane for the associated color sample. In general, the color plane indicated by or pointed to by a bit symbol (or index bits) may be considered an indicated color plane. For example, bit symbol 106d1 (00) indicates color sample 103d1 (Red) is in color plane 0 (as shown). Furthermore, for example, bit symbol 106f1 (00) indicates color sample 103f1 (Red) is in color plane 0 and bit symbol 106f4 (01) indicates color sample 103f4 (Blue) is in color plane 1 (also as shown).

In the terminology used herein, each of bit combinations 105a-105f is a reachable (e.g., not "unreachable") bit combination. For example, reachable bit combinations may be those that are reachable under a standard implementation of MSAA such as 4×MSAA. In general, the determination of bit combinations 105 may be performed by any suitable module of a computing system, such as, for example, an anti-aliasing compression module of a graphics processing unit, as is discussed herein. Furthermore, the determination of bit combinations 105 may be considered an operation or series of operations, which may be implemented via software, firmware, or hardware, as is also discussed herein below. As will be described in greater detail below, one or more of bit combinations 105a-105f may be transformed to an unreachable bit combination using the techniques discussed herein. The unreachable bit combination may indicate a characteristic associated with one or more of color planes 0, 1, 2, and/or 3, for example. As discussed, in other examples, 8×MSAA or 16×MSAA or any other number of samples may be used with increasing numbers of unreachable bit combinations as the number of samples per pixel increases.

In the following discussion, various examples are provided, generally in an order of increasing complexity to illustrate various techniques for transforming bit combinations to unreachable bit combinations to indicate characteristics associated with various color planes. The described examples are not meant to be limiting but are provided in order to provide an illustration of the various techniques. Furthermore, in the discussion herein, the following notation is utilized as shown in relationships (1) and (2):

$xy$+indicates a set of symbols includes at least one symbol of type $xy$, and (1)

$xy$*indicates a set of symbols includes zero or more symbols of type $xy$. (2)

Furthermore, a symbol may include one more bits that indicate or point to a color plane, such as, for example index bits for a color sample. For example, 01+ indicates a bit combination includes at least one 01 bit symbol (e.g., 01, and 01,01,01,01 would each satisfy 01+; however 00,00,00,00 would not satisfy 01+) and 10* indicates zero or more 10 bit symbols are in a bit combination (e.g., { } (empty) and 10 and 10,10,10,10 would each satisfy 10*). Furthermore, {01+,10*} indicates a bit combination includes at least one symbol of type 01 and zero or more symbols of type 10. Although discussed with respect to bit symbol 00 indicating color plane 0, bit symbol 01 indicating color plane 1, bit symbol 10 indicating color plane 2, and bit symbol 11 indicating color plane 3, any suitable bit symbols or bit symbol combinations may be used.

Additionally, the following discussion is presented with respect to 4×MSAA for the sake of clarity of presentation, however, the described techniques may be applied to any type of MSAA. In general, 4×MSAA may include 4 color planes, which may be labeled color planes 0-3 as described. A tile may generally include W×H pixels, where W is how wide the tile is in pixels and H is how high the tile is in pixels, and each pixel may include 4 color samples as described.

In general, in examples where a tile only points to plane 0 (e.g., only color plane 0 is populated for all of pixels 102 of tile 101), all of bit symbols 106 for bit combinations 105 may include {00+} and no other bit symbols may be used. In this example, therefore, every bit symbol 106 may be 00 and every bit combination may be 00,00,00,00. In such examples, all of pixels 102 will point to plane 0 such that the color associated with each of pixels 102 will be populated in color plane 0.

In general, in examples where a tile points to plane 0 and plane 1 but does not point to plane 2 or 3 (e.g., color plane 0 is populated for all of pixels 102 of tile 101 and color plane 1 is populated for at least one pixel of pixels 102), bit combinations 105 may be described by {00+,01+} (e.g., each bit combination 105 must include at least one 00 bit symbol and at least one of bit symbol 01) because there is always at least one 00 since plane 0 is always kept populated. Therefore, plane 0 is also always populated first of all the planes.

Similarly, in general, in examples where a tile points to planes 0, 1, and 2 but not plane 3, bit combinations 105 may be described by {00+,01*,10+}. Furthermore, it is noted that the set includes 01*, which may be included since plane 1 can be populated (01), but then overwritten by a 00 or 10, for example. Similarly, in general, in examples where a tile points to planes 0, 1, 2, and 3, bit combinations 105 may be described as {00+,01*,10*,11+}.

Based on the above, bit combinations 105 that may be used to indicate reachable bit combinations may be given as shown by relationships (3)-(6):

Plane 0 only: {00+}  (3)

Plane 0 and 1 only: {00+,01+}  (4)

Plane 0,1, and 2 only: {00+,01*,10+}  (5)

Plane 0,1,2, and 3: {00+,01*,10*,11+}  (6)

Furthermore, as discussed, available color planes 110 (see FIG. 1) may be populated in increasing order (e.g., from plane 0, to plane 1, and so on) and plane 0 may always be populated. Therefore, in various examples, some bit combinations may be unreachable. For example, {01+} (and similarly {10+} and {11+}) may be unreachable since, as described, the color planes may be populated in increasing order and plane 0 is always populated, therefore a result where plane 0 is not populated (e.g., 00 does not appear in the bit combination) but plane 1 is entirely populated may be unreachable. Such an unreachable bit combination (and other unreachable bit combinations as described) may be used to indicate a characteristic associated with at least one color plane.

Figure 2:
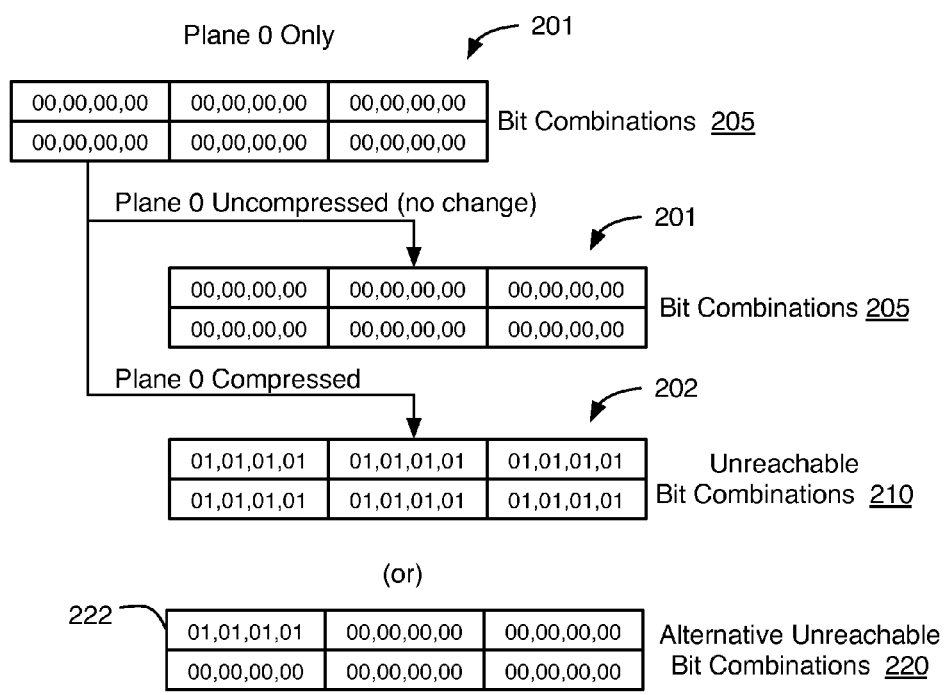
FIG. 2 is an illustrative diagram of an example process for indicating a characteristic in a color plane based on unreachable bit combination(s)

FIG. 2 is an illustrative diagram of an example process for indicating a characteristic in a color plane based on unreachable bit combination(s), arranged in accordance with at least some implementations of the present disclosure. FIG. 2 illustrates example bit combinations 205 for example tile 201. Please note that bit combinations 205 of FIG. 2 do not correspond to bit combinations 105 as illustrated in FIG. 1. As shown, each of bit combinations 205 may be the same (e.g., 00,00,00,00) and may include the same bit symbols 206 (00). Such examples may occur when only plane 0 is populated for tile 201 (it should be noted that plane 0 may be populated with any number of colors, each color associated with a pixel and, in the given example, each color sample of the pixel, and the entirety of tile 201 is not necessarily the same color).

As discussed, bit combinations 205 may be reachable bit combinations and may be given as {00+} using the notation discussed above. Furthermore, as discussed, the bit combination {01+} may be an unreachable bit combination. As shown in FIG. 2, the availability of unreachable bit combination {01+} may provide for the indication of a characteristic of color plane 0. In the illustrated example, the characteristic may be whether plane 0 is compressed. For example, if plane 0 is uncompressed, no change may be made to bit combinations 205, which may indicate plane 0 is uncompressed. If plane 0 is compressed, bit combinations 205 may be changed to unreachable bit combinations 210 such that each bit symbol 00 is changed to a bit symbol 01.

As shown in FIG. 2, in some examples, each of bit combinations 205 may be changed to unreachable bit combinations 210 to indicate a characteristic of color plane 0. In other examples, a single bit combination associated with one pixel (or more pixels) may be changed as shown. For example, a bit combination 222 (e.g., associated with a first pixel of tile 201) may be changed to an unreachable bit combination to indicate the characteristic of color plane 0.

As shown in FIG. 2 and discussed above with respect to FIG. 1, a single color plane of one or more color planes may be populated with one or more colors associated with color samples of pixels of a tile. In such examples, transforming one or more bit combination to unreachable bit combination(s) may include transforming each bit symbol of the bit combination. Furthermore, each bit symbol may be associated with a color sample of an individual pixel. In the given example, transforming each bit symbol to form the unreachable bit combination may include transforming each bit symbol from a 00 bit symbol to a 01 bit symbol. As discussed herein, the indicated characteristic may include any suitable characteristic, such as whether the single color plane has been compressed (e.g., a compression state) or the like.

As discussed, transforming each bit symbol may include transforming each bit symbol from a 00 bit symbol to a 01 bit symbol. Alternatively, each bit symbol may be transformed to an 10 or an 11 bit symbol, for example. Furthermore, each bit symbol may be changed for all the pixels or for a single (in the illustrated example a first pixel of tile 201) pixel. In some examples, a first, second, third, or more pixels may be transformed to indicate multiple characteristics of color plane 0 to indicate the multiple characteristics. That is, information regarding a color plane may be extracted from a particular state (e.g., reachable or unreachable) of an individual bit combination associated with an individual pixel, or set of individual pixels. As will be appreciated, since (previously) unreachable bit combinations may be used, no loss of information occurs such that the characteristic associated with a color plane may be indicated while the bit combinations may still provide an indicator to color plane 0 for each color sample. In general, the transformation of bit combination(s) to unreachable bit combinations may be performed by any suitable module of a computing system, such as, for example, an anti-aliasing compression module of a graphics processing unit, as is discussed herein. Furthermore, the transformation of bit combination(s) to unreachable bit combinations may be considered an operation or series of operations, which may be implemented via software, firmware, or hardware, as is also discussed herein.

Figure 3:
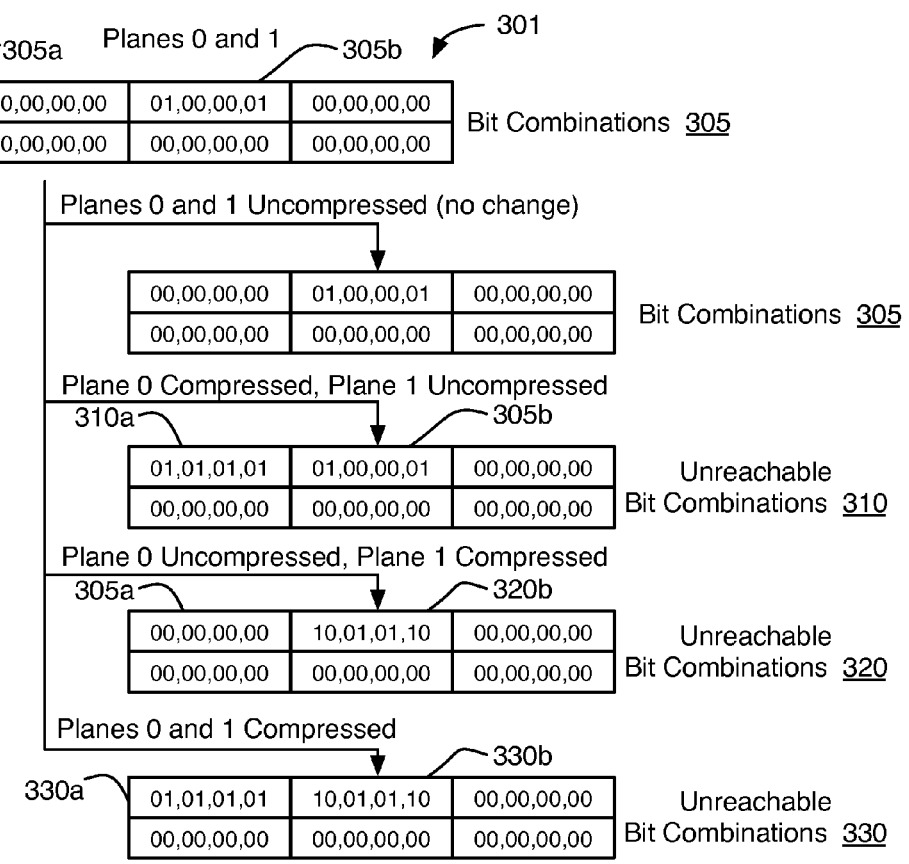
FIG. 3 is an illustrative diagram of an example process for indicating a characteristic in a color plane based on unreachable bit combination(s)

Turning now to an example where two color planes (e.g., color plane 0 and color plane 1) may be populated, FIG. 3 is an illustrative diagram of an example process for indicating a characteristic in a color plane based on unreachable bit combination(s), arranged in accordance with at least some implementations of the present disclosure. As discussed above, in examples where plane 0 and 1 only are populated (e.g., in use), the reachable bit combinations may be given as {00+, 01+}. Furthermore, in the given example, the available unreachable bit combinations may be given as {00+,10+}, {00+,11+}, {01+,10+}, {01+,11+}, and {10+,11+}. However, {00+,10+} is included in {00+,01*,10+} (for bit combinations in use with planes 0, 1, and 2 only, as shown above) and {00+,11+} is included in {00+,01*,11+} (for bit combinations in use with planes 0, 1, 2, and 3, as also shown above). Therefore, although unreachable when only planes 0 and 1 are populated, bit combinations {00+,10+} and {00+, 11+} may be used when additional planes may be populated. The following sets may therefore be unused and unreachable: {01+,10+}, {01+,11+}, and {10+,11+}.

In examples where a tile points to only planes 0 and 1, for compression status (or any other characteristic), four possibilities may be available as shown in:
Plane 0 and plane 1 are uncompressed,
Plane 0 is compressed and plane 1 is uncompressed,
Plane 0 is uncompressed and plane 1 is compressed, and
Plane 0 and plane 1 are compressed.

FIG. 3 illustrates example (reachable) bit combinations 305 associated with a tile 301. Please note that bit combinations 305 of FIG. 3 do not correspond to bit combinations 105 as illustrated in FIG. 1. As shown, bit combination 305a may be 00,00,00,00 (such that each bit symbol is 00) and bit combination 305b may be 01,00,00,01 (such that bit symbol 00 and bit symbol 01 may be in use). In this example, as discussed, four possible outcomes may occur when a characteristic (e.g., compression state or the like) may be given or indicated for 2 color planes (e.g., color plane 0 and color plane 1). In such examples, two pixels may be used to indicate the four possible statuses. As shown in FIG. 3, for example, if both plane 0 and plane 1 are uncompressed, no change may be made to bit combinations 305 (e.g., the bit combinations may remain in their reachable state). For example, no change to bit combination 305a (associated with a first pixel 302, for example, although not shown for clarity) may indicate that plane 0 is uncompressed. Furthermore, if plane 0 is compressed and plane 1 is uncompressed, bit combinations 305 may be transformed to unreachable bit combinations 310 (e.g. bit combination 305a may be transformed to unreachable bit combination 310a). For example, a transformation of bit combination 305a to unreachable bit combination 310a may indicate that plane 0 is compressed and no change to bit combination 305b may indicate plane 1 is uncompressed.

Similarly, if plane 0 is uncompressed and plane 1 is compressed, bit combinations 305 may be transformed to unreachable bit combinations 320. For example, a change of bit combination 305b to unreachable bit combination 320b may indicate that plane 1 is compressed and no change to bit combination 305a may indicate plane 0 is uncompressed. Furthermore, if plane 0 and plane 1 are compressed, bit combinations 305 may be transformed to unreachable bit combinations 330. For example, a change of bit combination 305a to unreachable bit combination 330a may indicate that plane 0 is compressed and no a change of bit combination 305b to unreachable bit combination 330b may indicate plane 1 is uncompressed. Using such techniques, information regarding a characteristic of a first color plane may be associated with a status (e.g., reachable or unreachable) of a bit combination associated with a first pixel and a characteristic of a second color plane may be associated with a status (e.g., reachable or unreachable) of a bit combination associated with a first pixel As shown in FIG. 3, in general, two pixels may be required to indicate or signal the discussed four available combinations. By changing (or not) the bit symbols of bit combinations 305a and 305b (which may be associated with first and second pixels of tile 301, for example). In such examples, an indication may be extracted from each of the first pixel and the second pixel (in a bitwise fashion, for example). As shown, since tile 301 uses color plane 0 and color plane 1, a pixel may have all bit symbols as 00 (e.g., 00,00,00,00 as shown at bit combination 305a) or a pixel may have a mix of bit symbols 00 and 01 (e.g., 01,00,00,01 as shown at bit combination 305b). As with the example of FIG. 2, a transformation from {00+} to {01+} (which is unused and unreachable) may be used for a pixel having a bit combination of {00+} and for a pixel with a mix of 00 and 01, 00 may be transformed to 01 and 01 may be transformed to 10. This may be given by relationships (7)-(10) as follows:

$$\{00+\} \rightarrow \{01+\} \text{(as before for only plane 0)} \qquad (7)$$

$$\{01+\} \rightarrow \{10+\} \qquad (8)$$

$$\{00+,01+\} \rightarrow \{01+,10+\}, \qquad (9)$$

which can be expressed more compactly as:

$$\{00*,01*\} \rightarrow \{01*,10*\} \qquad (10)$$

As shown in FIG. 3 and discussed above with respect to FIG. 1, two color planes, a first color plane and a second color plane (e.g., color plane 0 and color plane 1), of one or more available color planes may be populated with one or more colors associated with color samples of pixels of a tile. In such examples, transforming one or more bit combinations to unreachable bit combination(s) may include transforming a bit combination associated with a first pixel by transforming bit symbols of the bit combination. In some examples, the bit symbols may include transforming a bit symbol from a 00 bit symbol to a 01 bit symbol. Transforming the bit combination may indicate a characteristic of a color plane (such as color plane 0) such as the color plane being compressed or the like. Furthermore, transforming the bit combinations may include transforming a second bit combination associated with a second pixel to a second unreachable bit combination. Transforming the second bit combination associated with the second pixel may also include transforming bit symbols of the second bit combination and such a transformation may indicate a characteristic associated with the second color plane (such as color plane 1) such as the second color plane being compressed or the like. In general, the transformation of bit combination(s) to unreachable bit combinations as shown in FIG. 3 may be performed by any suitable module of a computing system, such as, for example, an anti-aliasing compression module of a graphics processing unit, as is discussed herein. Furthermore, the transformation of bit combination(s) to unreachable bit combinations may be considered an operation or series of operations, which may be implemented via software, firmware, or hardware, as is also discussed herein.

In the above examples, the following unreachable and unused bit combinations have been utilized: {01+}, {10+}, {01+,10+}. The following unreachable and unused bit combinations may still be available to provide indications of color plane characteristics similar to those discussed herein: {11+}, {01+,11+}, {10+,11+}, and {01+,10*,11+}. It is noted that each of these remaining unreachable and unused bit combinations each include 11 while none include 00. As discussed above, when three color planes (e.g., color planes 0, 1 and 2) are populated, the following bit combinations apply: {00+, 01*,10+}. The techniques discussed above may be extended to an indication of which (if any) of planes 0, 1, and/or 2 may be compressed (or have another characteristic as discussed herein). Such techniques, as discussed, may be useful for scenes and/or tiles that have several triangle edges (e.g., color boundaries) in them, which may cause the higher planes (e.g., planes 1 and 2) to be utilized more frequently. For example, if three color planes (color planes 0, 1, and 2) are in use, three pixels may be needed to indicate a characteristic (such as a compression state) for each populated color plane. The techniques described above with respect to FIGS. 1-3 may be extended to additional unreachable bit combinations as shown in relationships (11)-(17) as follows:

{00+}→{01+}(as above, see relationship (7))    (11)

{01+}→{10+}(as above, see relationship (8))    (12)

{10+}→{11+}(currently unused)    (13)

{00+,01+}→{01+,10+}(as above, see relationship (9))    (14)

{00+,10+}→{01+,11+}(currently unused)    (15)

{00+,01+,10+}→{01+,10+,11+}(currently unused)    (16)

which can be expressed more compactly as:

{00*,01*,10*}→{01*,10*,11*}    (17)

Figure 4:
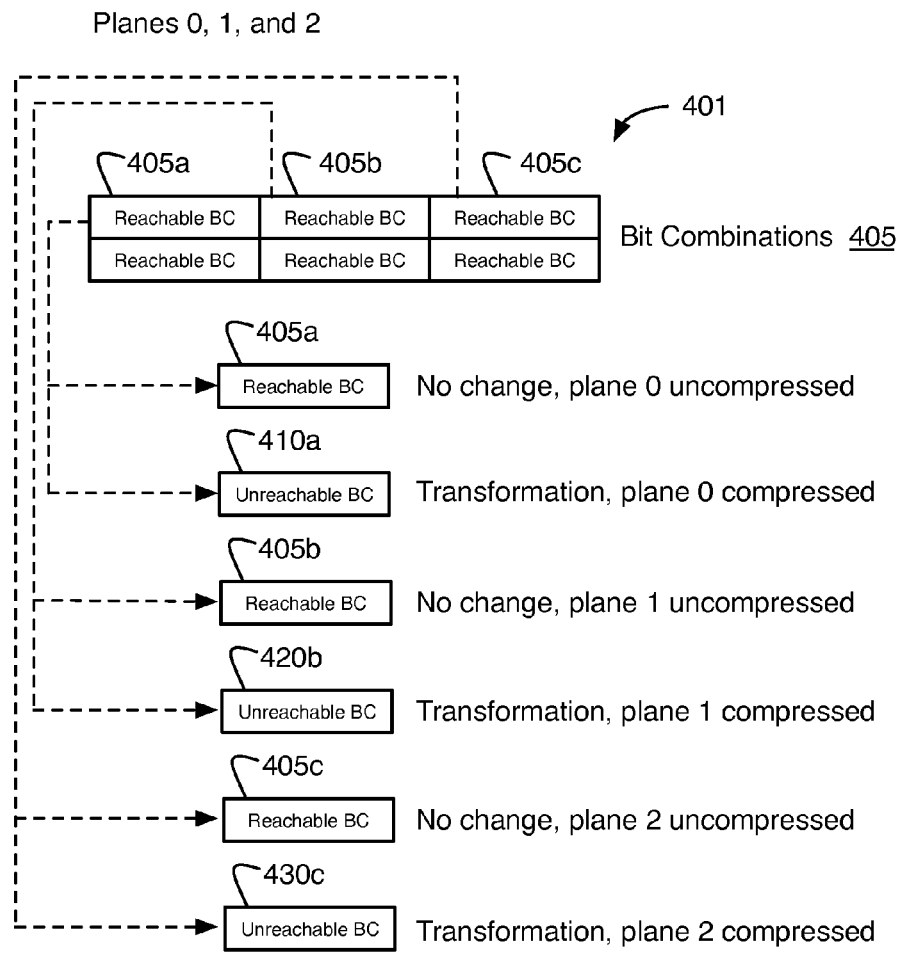
FIG. 4 is an illustrative diagram of an example process for indicating a characteristic in a color plane based on unreachable bit combination(s)

FIG. 4 is an illustrative diagram of an example process for indicating a characteristic in a color plane based on unreachable bit combination(s), arranged in accordance with at least some implementations of the present disclosure. As shown in FIG. 4, example bit combinations 405 may be determined for a tile 401. In general, three pixels may be required to indicate or signal the 8 available combinations of uncompressed/compressed states (or other characteristic) for each of color planes 0-2. For example, bit combination 405a may be used to indicate a characteristic for color plane 0, bit combination 405b may be used to indicate a characteristic for color plane 1, and bit combination 405c may be used to indicate a characteristic for color plane 2. Relationships (11)-(16) (or, as expressed compactly in relationship (17)) may be used to transform or not transform each of bit combinations 405a, 405b, and 405c such that no change (or transformation) indicates the associated color plane is not compressed (e.g., the bit combination remains reachable) and a transformation to the unreachable bit combination indicates the associated color plane is compressed.

For example, as shown in FIG. 4, making no transformation to (reachable) bit combination 405a (associated with a first pixel, not shown) may indicate plane 0 is uncompressed while transforming bit combination 405a to unreachable bit combination 410a (e.g., according to the above described relationships) may indicate plane 0 is compressed. Similarly, making no transformation to (reachable) bit combination 405b (associated with a second pixel, not shown) may indicate plane 1 is uncompressed while transforming bit combination 405b to unreachable bit combination 420b (e.g., according to the above described relationships) may indicate plane 1 is compressed. Furthermore, making no transformation to (reachable) bit combination 405c (associated with a third pixel, not shown) may indicate plane 2 is uncompressed while transforming bit combination 405c to unreachable bit combination 430c (e.g., according to the above described relationships) may indicate plane 2 is compressed. As discussed above, transforming any of bit combinations 405a-405c may include transforming bit symbols of the associated bit combination. In general, the transformation of bit combination(s) to unreachable bit combinations may be performed by any suitable module of a computing system, such as, for example, an anti-aliasing compression module of a graphics processing unit, as discussed herein. Furthermore, the transformation of bit combination(s) to unreachable bit combinations may be considered an operation or series of operations, which may be implemented via software, firmware, or hardware, as discussed herein.

As discussed, transforming one or more bit combinations may provide an indication associated with a populated color plane. Also as discussed, a bit combination of a pixel may be associated with a characteristic and color plane to indicate or signal the characteristic. In general, any number of pixels, bit combinations, and color plane characteristics may be indicated in such a manner. For example, multiple pixels and associated bit combinations may be used to indicate multiple characteristics of a single color plane. In other examples, a first pixel and associated bit combination may indicate a characteristic of a higher level color plane (e.g., color plane 1, 2, or 3) instead of a first or lowest level color plane (e.g., color plane 0), and so on.

Furthermore, the discussed unreachable bit combinations may be used when reading a tile back, for example. When reading a tile, unreachable bit combination(s) may be detected. Based on the detection and a determination based on the unreachable bit combination(s), the characteristic may be determined. For example, an unreachable bit combination may indicate one or more color planes are compressed or the like.

As will be discussed in greater detail below, a system, such as a computer-implemented system may be used to perform some or all of the various operations discussed herein in connection with FIGS. 1-4, 5, 6, and 7.

Figure 5:
FIG. 5 is a flow chart illustrating an example graphics rendering process.

FIG. 5 is a flow chart illustrating an example process 500, arranged in accordance with at least some implementations of the present disclosure. In general, process 500 may provide a computer-implemented method for providing anti-aliasing in graphics rendering. In the illustrated implementation, process 500 may include one or more operations, functions or actions as illustrated by one or more of blocks 502 and/or 504. By way of non-limiting example, process 500 will be described herein with reference to operations discussed with respect to FIGS. 1-4 above and example system 100 discussed below.

Process 500 may be utilized as a computer-implemented method for providing anti-aliasing in graphics rendering. Process 500 may begin at block 502, "Determine, for Individual Pixels of a Tile Of Pixels, Bit Combinations that Indicate Color Planes for Color Samples of the Individual Pixels", where bit combinations for individual pixels of a tile of pixels may be determined. Bit combinations 105 may be determined for pixels 102 of tile 101, for example. The bit combinations may be determined by an anti-aliasing compression module 635 of a graphics processing unit or units 630, as is discussed below. For example, the individual pixels may include two or more color samples within the individual pixels (e.g., color samples 103). The determined bit combinations may indicate one or more indicated color planes of one or more populated color planes associated with the color samples of the individual pixels, as discussed above. The one or more populated color planes may be populated with one or more colors associated with the color samples of the individual pixels.

Processing may continue from operation 502 to operation 504, "Transform a Bit Combination to an Unreachable Bit Combination that Indicates a Characteristic Associated with a Color Plane", where a bit combination, such as a reachable bit combination, may be transformed to an unreachable bit combination such that the unreachable bit combination indicates a characteristic associated with a color plane. For example, a bit combination of bit combinations 205, 305, or 405 may be transformed to an unreachable bit combination 210, 220, 310, 320, 330, 410, 420, or 430 or the like, as discussed herein. The transformation may be performed by an anti-aliasing compression module 635 of a graphics processing unit or units 630, as is discussed below. For example, the characteristic associated with the color plane may indicate that the color plane may be compressed.

Some additional and/or alternative details related to process 500 may be illustrated in one or more examples of implementations discussed in greater detail below with regard to FIG. 6.

Figure 6:
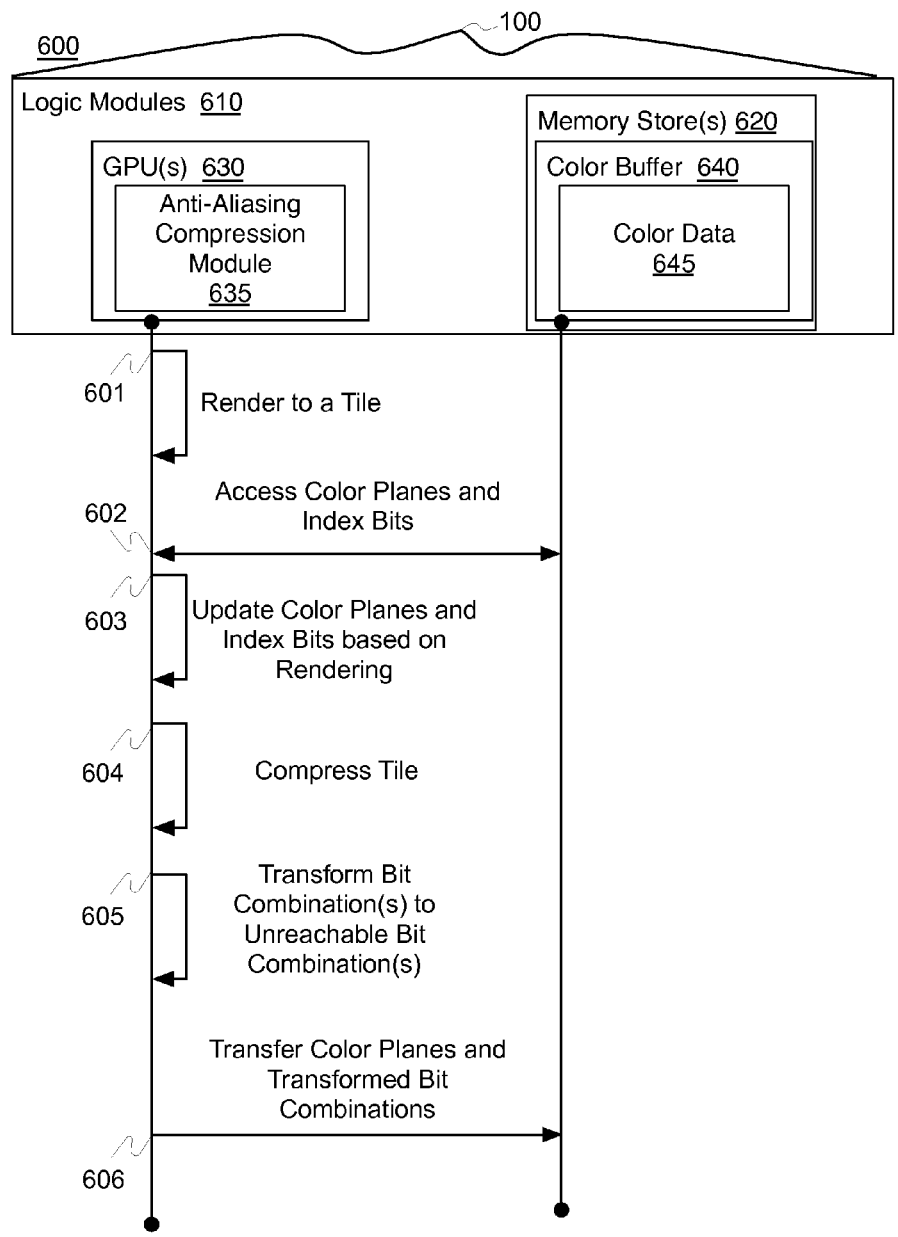
FIG. 6 is an illustrative diagram of an example graphics rendering process in operation.

FIG. 6 is an illustrative diagram of example system 100 and process 600 for providing anti-aliasing in graphics rendering, arranged in accordance with at least some implementations of the present disclosure. In the illustrated implementation, process 600 may include one or more operations, functions or actions as illustrated by one or more of actions 601, 602, 603, 604, 605 and/or 606. By way of non-limiting example, process 600 also will be described herein with reference to example video coding system 100 of FIG. 8, as is described herein below.

In the illustrated implementation, system 100 may include logic modules 610, the like, and/or combinations thereof. For example, modules 610, may include memory store(s) 620, graphics processing unit(s) 630, which may include anti-aliasing compression module 635, and color buffer 640, the like, and/or combinations thereof.

Anti-aliasing compression module 635 may be configured to determine bit combinations for individual pixels of a tile of pixels such that the individual pixels include two or more color samples within the individual pixels and the bit combinations indicate one or more indicated color planes of one or more populated color planes as described herein. Furthermore, the one or more populated color planes may be populated with one or more colors associated with the color samples of the individual pixels, also as described herein. Anti-aliasing compression module 635 may also be configured to transform a bit combination of the determined bit combinations to an unreachable bit combination such that the unreachable bit combination indicates a characteristic associated with at least one color plane of the one or more color planes. Furthermore, anti-aliasing module 635 may be configured to transfer color data 645 to color buffer 640 such that color data 645 may include the unreachable bit combination. Furthermore, anti-aliasing module 635 (or another module of graphics processing unit(s) 630) may be configured to render a tile of pixels, access one or more color planes via a color buffer, and/or update the one or more accessed color planes based on the rendering. Based on the updated color planes, the discussed bit combination determinations and transformations may be performed, and the resultant data (e.g., color data) may be transferred to the color buffer.

Process 600 may be utilized as a computer-implemented method for providing anti-aliasing in graphics rendering. Process 600 may begin at block 601, "Render to a Tile", where a tile of pixels may be rendered. The tile may be rendered using any suitable techniques and may generate a tile of pixels as discussed herein. The rendering may be based on any suitable data such as image data, model, models, or model data, scene data, vector data, raster data, or the like.

Processing may continue from operation 601 to operation 602, "Access Color Planes and Index Bits", where anti-aliasing compression module 635 may access color planes and index bits via color buffer 640 of memory stores 620. The color planes and index bits may contain any data as discussed herein (either compressed or uncompressed). In some examples, the index bits may include unreachable bit combinations and, in other examples, the index bits may include reachable bit combinations as discussed herein.

Processing may continue from operation 602 to operation 603, "Update Color Planes and Index Bits based on Rendering", where the one or more accessed color planes may be updated based on the rendering. In some examples, the one or more accessed color planes may be updated to the one or more populated color planes, as discussed herein. Further, index bits may be updated at operation 603. For example, index bits and bit combinations for individual pixels of a tile of pixels may be determined as described herein. For example, bit combinations 105 may be determined for pixels 102 of tile 101. The bit combinations may be determined by anti-aliasing compression module 635 of a graphics processing unit(s) 630 based at least in part on the described rendering. For example, the individual pixels may include two or more color samples within the individual pixels (e.g., color samples 103). As discussed, the determined bit combinations may indicate one or more indicated color planes of one or more populated color planes associated with the color samples of the individual pixels, as discussed above.

Processing may continue from operation 603 to operation 604, "Compress Tile", where the updated tile of pixels may be compressed. In some examples, a compression determination may be made. If it is determined a compression may be advantageous (for example, based on the color data in a plane or based on meeting a cache line threshold or the like), the updated tile of pixels may be compressed as discussed herein. As discussed, in various examples, a compression may be a characteristic associated with a color plane, which may be indicated using unreachable bit combinations as discussed herein. In various examples, tile compression may be performed after a cache evict.

Processing may continue from operation 604 to operation 605, "Transform Bit Combination(s) to Unreachable Bit Combination(s)", where a bit combination, such as a reachable bit combination, may be transformed to an unreachable bit combination such that the unreachable bit combination indicates a characteristic associated with a color plane. The transformation may be performed by anti-aliasing compression module 635 of graphics processing unit or units 630, for example. The characteristic associated with the color plane may indicate that the color plane may be compressed. For example, a bit combination of bit combinations 205, 305, or 405 may be transformed to an unreachable bit combination 210, 220, 310, 320, 330, 410, 420, or 430 or the like, as discussed herein. For example, color data 645 may include the determined unreachable bit combination.

Processing may continue from operation 603 to operation 604, "Transfer Color Planes and Transformed Bit Combinations", where color data 645 including the color planes and determined unreachable bit combination may be transferred by graphics processing unit(s) 630 to color buffer 640, which may receive and store color data 645.

In general, process 600 may be repeated any number of times either in serial or in parallel, as needed. Furthermore, in general, anti-aliasing compression module 635 may be implemented via hardware, software, and or firmware. As shown, in some implementations, anti-aliasing compression module 635 may be implemented via graphics processing unit(s) 630. In other implementations, anti-aliasing compression module 635 may be implemented via software implemented via one or more central processing unit(s). In general, anti-aliasing compression module 635 and/or the operations discussed herein may be enabled or enabled at a system or user level, for example.

Figure 7:
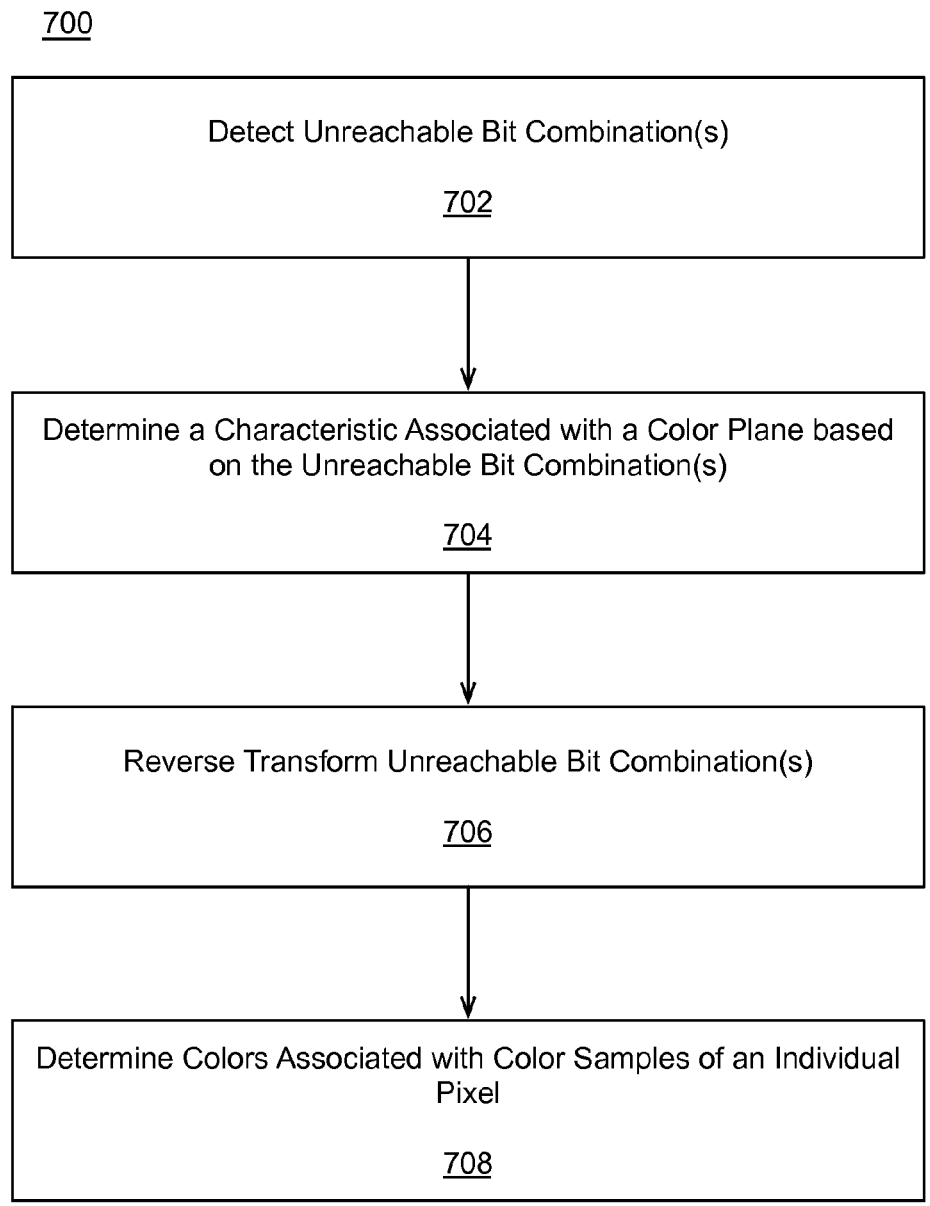
FIG. 7 is a flow chart illustrating an example graphics rendering process.

FIG. 7 is a flow chart illustrating an example graphic rendering process, arranged in accordance with at least some implementations of the present disclosure. In general, process 700 may provide a computer-implemented method for providing anti-aliasing in graphics rendering. In the illustrated implementation, process 700 may include one or more operations, functions or actions as illustrated by one or more of blocks 702, 704, 706, and/or 708. By way of non-limiting example, process 700 will be described herein with reference to operations discussed with respect to FIGS. 1-4 above and example system 100 discussed below.

Process 700 may be utilized as a computer-implemented method for providing anti-aliasing in graphics rendering. Process 700 may begin at block 702, "Detect Unreachable Bit Combination(s)", where, when a tile is being read back, for example, the associated index bits may be examined. As discussed, in some examples, the index bits may include unreachable bit combination(s), which may indicate a characteristic associated with a color plane. In general, the detected unreachable bit combination may be any unreachable bit combination as discussed herein.

Process 700 may continue from block 702 to block 704, "Determine a Characteristic Associated with a Color Plane based on the Unreachable Bit Combination(s)" where a characteristic of a color plane may be determined based on the unreachable bit combination. For example, the characteristic may include a color plane being compressed or the like.

Process 700 may continue from block 704 to block 706, "Reverse Transform Unreachable Bit Combination(s)", where the unreachable bit combinations may be reverse transformed back to reachable bit combinations. For example, a reverse transform may be based on expression (11) above (e.g., {00+}→{01+}), which may have been used to indicate plane 0 has been compressed, which means that the index bits will all be 01, for example. When the index bits are read back, a reverse transform may be performed (e.g., based on the detection of unreachable bit combination {01+} at block 702) such that the index bits are transformed as shown in relationship (23):

$$\{01\}+\rightarrow\{00+\} \text{(reverse transform for expression (11))} \quad (23)$$

Similarly, reverse transforms may be determined based on the relationships given above. Process 700 may continue from block 706 to block 708, "Determine Colors Associated with Color Samples of an Individual Pixel",", where colors associated with color samples of an individual pixel may be determined. For example, the reachable bit combinations and index bits may be used to access one or more color planes to determine color(s) associated with color sample(s) of individual pixels. For example, colors may be determined for color samples 103 of tile 101 of pixels 102, as discussed herein.

While implementation of example processes 500, 600, 700, and other processes discussed herein may include the undertaking of all blocks shown in the order illustrated, the present disclosure is not limited in this regard and, in various examples, implementation of processes 200 and 300 may include the undertaking only a subset of the blocks shown and/or in a different order than illustrated.

In addition, any one or more of the blocks or operations discussed herein (such as the operations illustrated and discussed with respect to FIGS. 1-7) may be undertaken in response to instructions provided by one or more computer program products. Such program products may include signal bearing media providing instructions that, when executed by, for example, a processor, may provide the functionality described herein. The computer program products may be provided in any form of computer readable medium. Thus, for example, a processor including one or more processor core(s) may undertake one or more of the blocks or operations discussed herein.

As used in any implementation described herein, the term "module" refers to any combination of software, firmware and/or hardware configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth.

As discussed, transforming one or more bit combinations may provide an indication associated with a populated color plane. Also as discussed, a bit combination of a pixel may be associated with a characteristic and color plane to indicate or signal the characteristic. In other examples, the unreachable bit combinations may be used for other purposes. For example, another usage area for the remaining bit combinations ({11+}, {01+,11+}, {10+,11+}, and {01+,10*,11+}) may be to handle cleared samples.

For example, to save bandwidth as discussed herein, it may be advantageous to signal if a sample (e.g., a color sample) may be cleared. For example, a bit symbol 11 may indicate the sample is cleared. For example, if rendering starts, plane 0 may be populated for some pixels in a tile. As discussed, bit symbol 00 may be used to indicate or "point to" plane 0, and bit symbol 11 may be used to indicate that some samples may be cleared. However, in the discussed examples, {00+,11+} may already be in use, such that bit symbol 11 may not indicate cleared samples and, in some examples, bit symbol 00 may be transformed to bit symbol 01. When a tile is cleared, all bit symbols (e.g., sample indices) may be set to 11 in the entire tile. Setting all bit symbols to 11 for the entire tile may indicate that all samples are cleared, for example. In examples where color plane 1 populated, bit symbols 00 may be written to the indices and, if at least one 11 remains in the tile, the 00 will be transformed to 01. Such examples may provide for an indication of whether a sample is cleared since {01*,11+} is an unreachable bit combination.

For decoding or reading, bit symbol 11 may indicate a cleared sample while bit symbol 01 may be transformed back to bit symbol 00 to indicate that it indicates or points to plane 0. In this example, all bit symbols (e.g., indices) in a tile may be transformed, and it may be assumed that at least one bit symbol 11 may occur in the entire tile. Otherwise, an overlap may occur with the previously discussed color plan characteristics, such as compression states, for example. To summarize, a tile may be transformed as follows in relationships (18):

$$\{00^*, clr+\} \rightarrow \{01^*, 11+\} \quad (18)$$

where clr may indicate a cleared sample.

The cleared sample example may be generalized to handle cleared samples when plane 0 and plane 1 may be populated. For example, before being transformed, such a tile may contain bit combinations $\{00+, 01^*, clr+\}$ that may be transformed to $\{01+, 10^*, 11+\}$, which may be described as follows in relationship (19):

$$\{00+, 01^*, clr+\} \rightarrow \{01+, 10^*, 11+\} \quad (19)$$

For example, as all bit symbols 11 disappear from a tile, the bit symbols (e.g., indices) may be transformed back to their original bit symbols. Based on the above, only bit combination $\{10+, 11+\}$ may remain as unused and unreachable. In such examples, remaining bit combination $\{10+, 11+\}$ may be used to signal a characteristic such as compression when only color plane 0 is populated and when some cleared samples occur in the tile. As shown above in relationship (18), the transform for bit symbols (e.g., indices) if only plane 0 is populated and at least one cleared sample exists is $\{00+, clr+\} \rightarrow \{01^*, 11+\}$. In such examples, if the tile may be compressed, the compression status may be indicated by changing all bit symbols (e.g., indices) in the tile according to relationship (20), as follows:

$$\{01+, 11+\} \rightarrow \{10+, 11+\} \quad (20)$$

Based on the above, the total transformation may be given as shown in relationships (21) and (22) as follows:

$$\{00+, clr+\} \rightarrow \{01+, 11+\} \text{(tile is not compressed)} \quad (21)$$

$$\{00+, clr+\} \rightarrow \{01+, 11+\} \rightarrow \{10+, 11+\} \text{(tile is compressed)} \quad (22)$$

Using the described techniques, all unreachable bit combinations may be utilized. As will be appreciated, the unreachable bit combinations may be used to indicate a variety of information related to color plane compression state, color plane compression state, sample clearing, or the like as described herein.

Figure 8:
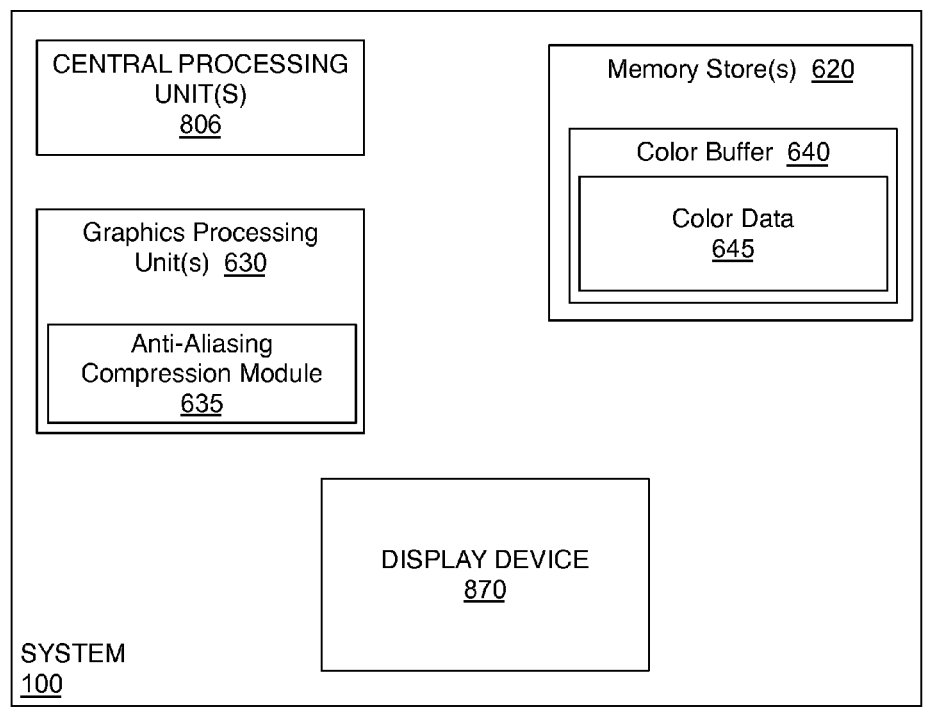
FIG. 8 is an illustrative diagram of an example system for providing graphics rendering.

FIG. 8 is an illustrative diagram of an example system 100 for providing graphics rendering, arranged in accordance with at least some implementations of the present disclosure. In the illustrated implementation, system 100 may include one or more central processing units 806, one or more memory stores 620, one or more graphics processing units 630, color buffer 640 and/or a display device 870. Central processing units 806, memory store 620, graphics processing units 630, buffer 640, and/or display device 870 may be capable of communication with one another, via, for example, a bus or other access. In various implementations, display device 870 may be integrated in system 100 or implemented separately from system 100.

As shown in FIG. 8, and discussed above, anti-aliasing compression module 635 may be implemented via graphics processing units 630. In other example, anti-aliasing compression module 635 may be implanted via central processing units 806. As shown, graphics processing unit 630 may include anti-aliasing compression module 635. Graphics processing unit 630 may be communicatively coupled to color buffer 640. Anti-aliasing compression module 635 may be configured to determine bit combinations for individual pixels of a tile of pixels such that the individual pixels include two or more color samples within the individual pixels and the bit combinations indicate one or more indicated color planes of one or more populated color planes and such that the one or more populated color planes are populated with one or more colors associated with the color samples of the individual pixels, transform at least one bit combination of the bit combinations to an unreachable bit combination such that the unreachable bit combination indicates a characteristic associated with at least one color plane of the one or more color planes, and transfer color data to the color buffer, wherein the color data includes the unreachable bit combination. In general, memory stores 620 may be communicatively coupled to graphics processing unit 630. Memory stores 620 may include color 640, which may be accessed by anti-aliasing compression module 635 to retrieve color planes and/or index bits. Furthermore, display device 870 may be configured to display output image data (not shown) based at least in part on color data 645. As discussed, anti-aliasing compression module 635 may be further configured to render a tile of pixels, access one or more color planes and/or index bits via color buffer 640, and/or update the accessed color planes and/or index bits to the one or more populated color planes.

Furthermore, anti-aliasing compression module 635 may be configured to detect the unreachable bit combination, determine a characteristic associated with at least one color plane of the one or more color planes based on the unreachable bit combination, reverse transforming the unreachable bit combination to a reachable bit combination, and/or determine color samples based at least in part on the reachable bit combination, as discussed with respect to FIG. 8 herein.

As will be appreciated, the modules illustrated in FIG. 8 may include a variety of software and/or hardware modules and/or modules that may be implemented via software and/or hardware. For example, the modules may be implemented as software via central processing units 806 and/or graphics processing units 630 or the modules may be implemented via a dedicated hardware portion or portions of graphics processing units 630. Furthermore, the shown memory stores 620 may be shared memory for central processing units 806 and/or graphics processing units 620, for example. Furthermore, color buffer 640 may be implemented via memory stores 620 or separately from memory stores 620 and/or color buffer may be implemented via a general buffer that may include other buffer portions such as a render buffer, or the like. Also, system 100 may be implemented in a variety of ways. For example, system 100 (excluding display device 870) may be implemented as a single chip or device having a graphics processor, a quad-core central processing unit, on-board cache, and a memory controller input/output (I/O) module (not shown). In other examples, system 100 (again excluding display device 870) may be implemented as a chipset.

Central processing units 806 may include any suitable implementation including, for example, microprocessor(s), multicore processors, application specific integrated circuits, chip(s), chipsets, or the like. Furthermore, graphics processing units 630 may include any suitable implementation including, for example, processor(s), multicore processors, application specific integrated circuits, programmable logic devices, graphics cards, integrated graphics, general purpose graphics processing unit(s), or the like. In addition, memory stores 620 and/or color buffer 640 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory stores 620 and/or color buffer 640 may be implemented via cache memory. In various examples, system 100 may be implemented as a chipset or as a system on a chip.

Figure 9:
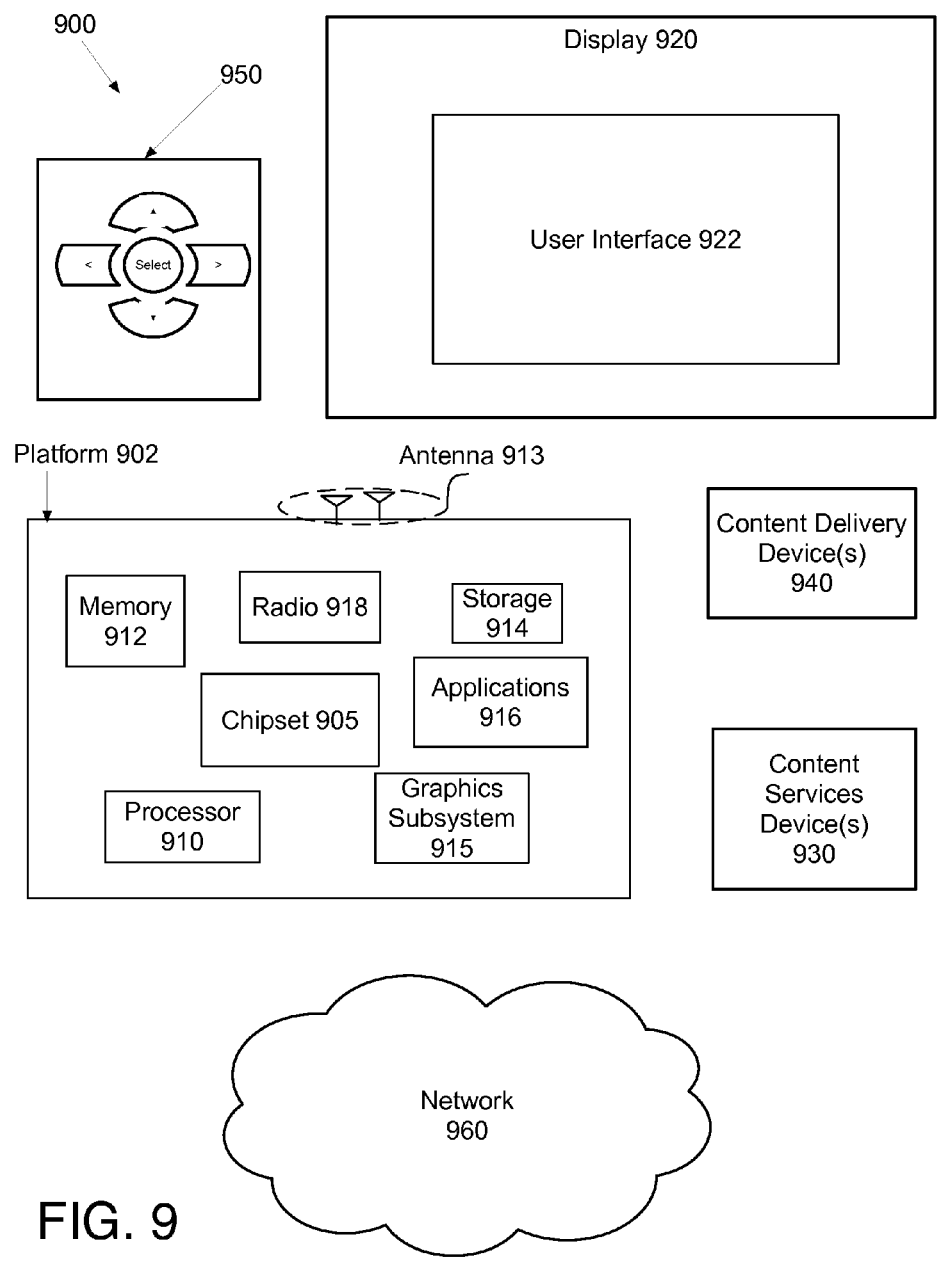
FIG. 9 is an illustrative diagram of an example system.

FIG. 9 illustrates an example system 900 in accordance with the present disclosure. In various implementations, system 900 may be a media system although system 900 is not limited to this context. For example, system 900 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In various implementations, system 900 includes a platform 902 coupled to a display 920. Platform 902 may receive content from a content device such as content services device(s) 930 or content delivery device(s) 940 or other similar content sources. A navigation controller 950 including one or more navigation features may be used to interact with, for example, platform 902 and/or display 920. Each of these components is described in greater detail below.

In various implementations, platform 902 may include any combination of a chipset 905, processor 910, memory 912, storage 914, graphics subsystem 915, applications 916 and/or radio 918. Chipset 905 may provide intercommunication among processor 910, memory 912, storage 914, graphics subsystem 915, applications 916 and/or radio 918. For example, chipset 905 may include a storage adapter (not depicted) capable of providing intercommunication with storage 914.

Processor 910 may be implemented as a Complex Instruction Set Computer (CISC) or Reduced Instruction Set Computer (RISC) processors; x86 instruction set compatible processors, multi-core, or any other microprocessor or central processing unit (CPU). In various implementations, processor 910 may be dual-core processor(s), dual-core mobile processor(s), and so forth.

Memory 912 may be implemented as a volatile memory device such as, but not limited to, a Random Access Memory (RAM), Dynamic Random Access Memory (DRAM), or Static RAM (SRAM).

Storage 914 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 914 may include technology to increase the storage performance enhanced protection for valuable digital media when multiple hard drives are included, for example.

Graphics subsystem 915 may perform processing of images such as still or video for display. Graphics subsystem 915 may be a graphics processing unit (GPU) or a visual processing unit (VPU), for example. An analog or digital interface may be used to communicatively couple graphics subsystem 915 and display 920. For example, the interface may be any of a High-Definition Multimedia Interface, Display Port, wireless HDMI, and/or wireless HD compliant techniques. Graphics subsystem 915 may be integrated into processor 910 or chipset 905. In some implementations, graphics subsystem 915 may be a stand-alone card communicatively coupled to chipset 905.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In other embodiments, the functions may be implemented in a consumer electronics device.

Radio 918 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 918 may operate in accordance with one or more applicable standards in any version.

In various implementations, display 920 may include any television type monitor or display. Display 820 may include, for example, a computer display screen, touch screen display, video monitor, television-like device, and/or a television. Display 920 may be digital and/or analog. In various implementations, display 920 may be a holographic display. Also, display 920 may be a transparent surface that may receive a visual projection. Such projections may convey various forms of information, images, and/or objects. For example, such projections may be a visual overlay for a mobile augmented reality (MAR) application. Under the control of one or more software applications 916, platform 902 may display user interface 922 on display 920.

In various implementations, content services device(s) 930 may be hosted by any national, international and/or independent service and thus accessible to platform 902 via the Internet, for example. Content services device(s) 930 may be coupled to platform 902 and/or to display 920. Platform 902 and/or content services device(s) 930 may be coupled to a network 960 to communicate (e.g., send and/or receive) media information to and from network 960. Content delivery device(s) 940 also may be coupled to platform 902 and/or to display 920.

In various implementations, content services device(s) 930 may include a cable television box, personal computer, network, telephone, Internet enabled devices or appliance capable of delivering digital information and/or content, and any other similar device capable of unidirectionally or bidirectionally communicating content between content providers and platform 902 and/display 920, via network 960 or directly. It will be appreciated that the content may be communicated unidirectionally and/or bidirectionally to and from any one of the components in system 900 and a content provider via network 960. Examples of content may include any media information including, for example, video, music, medical and gaming information, and so forth.

Content services device(s) 930 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 902 may receive control signals from navigation controller 950 having one or more navigation features. The navigation features of controller 950 may be used to interact with user interface 922, for example. In embodiments, navigation controller 950 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 950 may be replicated on a display (e.g., display 920) by movements of a pointer, cursor, focus ring, or other visual indicators displayed on the display. For example, under the control of software applications 916, the navigation features located on navigation controller 950 may be mapped to virtual navigation features displayed on user interface 922, for example. In embodiments, controller 950 may not be a separate component but may be integrated into platform 902 and/or display 920. The present disclosure, however, is not limited to the elements or in the context shown or described herein.

In various implementations, drivers (not shown) may include technology to enable users to instantly turn on and off platform 902 like a television with the touch of a button after initial boot-up, when enabled, for example. Program logic may allow platform 902 to stream content to media adaptors or other content services device(s) 930 or content delivery device(s) 940 even when the platform is turned "off." In addition, chipset 905 may include hardware and/or software support for 7.1 surround sound audio and/or high definition (7.1) surround sound audio, for example. Drivers may include a graphics driver for integrated graphics platforms. In embodiments, the graphics driver may comprise a peripheral component interconnect (PCI) Express graphics card.

In various implementations, any one or more of the components shown in system 900 may be integrated. For example, platform 902 and content services device(s) 930 may be integrated, or platform 902 and content delivery device(s) 940 may be integrated, or platform 902, content services device(s) 930, and content delivery device(s) 940 may be integrated, for example. In various embodiments, platform 902 and display 920 may be an integrated unit. Display 920 and content service device(s) 930 may be integrated, or display 920 and content delivery device(s) 940 may be integrated, for example. These examples are not meant to limit the present disclosure.

In various embodiments, system 900 may be implemented as a wireless system, a wired system, or a combination of both. When implemented as a wireless system, system 900 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 900 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 902 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 9.

Figure 10:
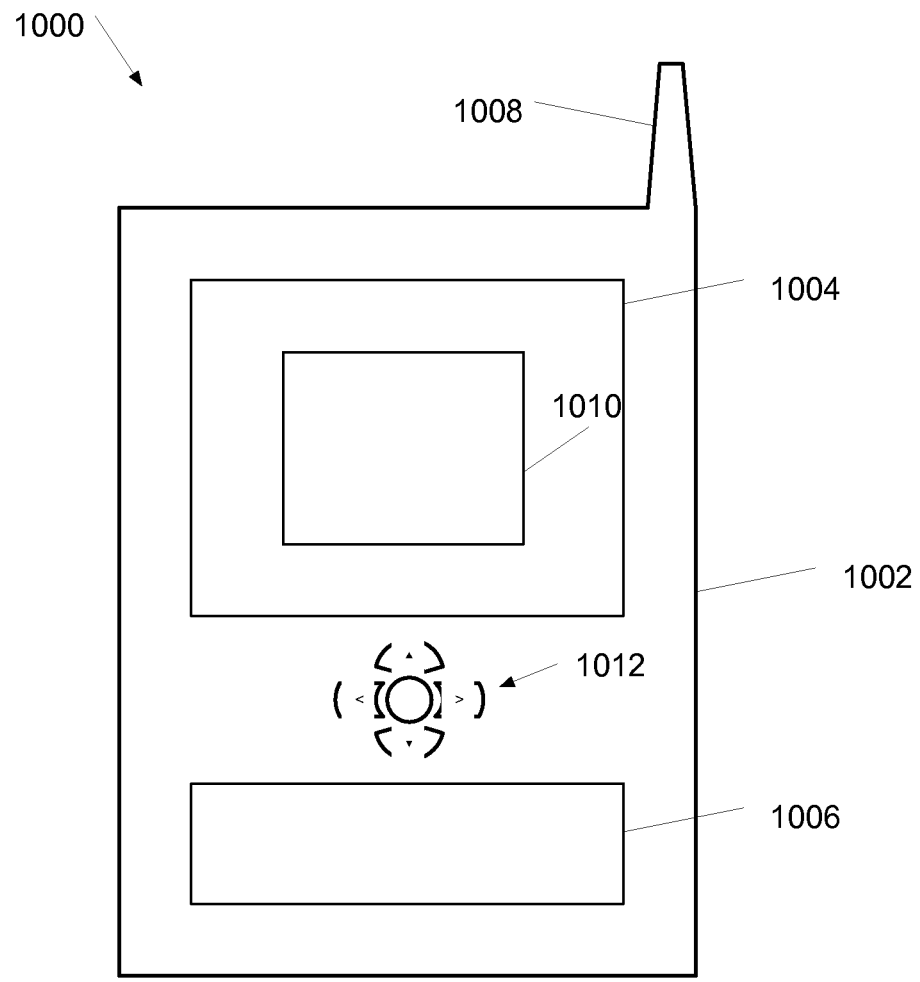
FIG. 10 illustrates an example device, all arranged in accordance with at least some implementations of the present disclosure.

As described above, system 1000 may be embodied in varying physical styles or form factors. FIG. 10 illustrates implementations of a small form factor device 1000 in which system 1000 may be embodied. In embodiments, for example, device 1000 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 10, device 1000 may include a housing 1002, a display 1004, an input/output (I/O) device 1006, and an antenna 1008. Device 1000 also may include navigation features 1012. Display 1004 may include any suitable display unit for displaying information appropriate for a mobile computing device. I/O device 1006 may include any suitable I/O device for entering information into a mobile computing device. Examples for I/O device 1006 may include an alphanumeric keyboard, a numeric keypad, a touch pad, input keys, buttons, switches, rocker switches, microphones, speakers, voice recognition device and software, and so forth. Information also may be entered into device 1000 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to additional embodiments.

In one example, a computer-implemented method for providing anti-aliasing in graphics rendering may include determining bit combinations for individual pixels of a tile of pixels such that the individual pixels include two or more color samples within the individual pixels, the bit combinations indicate one or more indicated color planes of one or more populated color planes associated with the color samples of the individual pixels, and the one or more populated color planes are populated with one or more colors associated with the color samples of the individual pixels and transforming at least one bit combination of the bit combinations to an unreachable bit combination such that the unreachable bit combination may indicate a characteristic associated with at least one color plane of the one or more color planes.

In other examples of a computer-implemented method for providing anti-aliasing in graphics rendering, the tile of pixels may be rendered, one or more color planes may be accessed via a color buffer, the one or more color planes may be updated to the one or more populated color planes, color data including the unreachable bit combination may be transferred to the color buffer, the unreachable bit combination may be detected, the characteristic associated with at least one color plane of the one or more color planes may be determined based on the unreachable bit combination, the unreachable bit combination may be reverse transformed to a reachable bit combination, and the two or more color samples may be determined based at least in part on the reachable bit combination. The characteristic may include at least one of a compression state of the at least one color plane, a compression type of the at least one color plane, or whether the at least one color plane includes cleared color samples. The one or more populated color planes may include a single populated color plane, and transforming the at least one bit combination may include transforming each bit symbol of the at least one bit combination such that each bit symbol is associated with a color sample of the two or more color samples, transforming each bit symbol comprises transforming each bit symbol from a 00 bit symbol to a 01 bit symbol, and the characteristic comprises the single populated color plane being compressed. The one or more color planes may include two populated color planes, a first populated color plane and a second populated color plane such that the at least one bit combination may be associated with a first pixel, and transforming the at least one bit combination may include transforming a first bit symbol of the at least one bit combination such that transforming the first bit symbol may include transforming the first bit symbol from a 00 bit symbol to a 01 bit symbol, and such that the characteristic may include the first populated color plane being compressed, and transforming the at least one bit combination may further include transforming a second bit combination associated with a second pixel to a second unreachable bit combination such that transforming the second bit combination associated with the second pixel may include transforming a second bit symbol of the second bit combination, transforming the second bit combination to the second unreachable bit combination may indicate a second characteristic associated with the second populated color plane, and the second characteristic comprises the second populated color plane being compressed. The one or more populated color planes may include three populated color planes, a first populated color plane, a second populated color plane, and a third populated color plane such that the at least one bit combination may be associated with a first pixel, transforming the at least one bit combination may include transforming a first bit symbol of the at least one bit combination and the characteristic may include the first populated color plane being compressed, and transforming the at least one bit combination may further include transforming a second bit combination associated with a second pixel to a second unreachable bit combination such that transforming the second bit combination associated with the second pixel comprises transforming a second bit symbol of the second bit combination, transforming the second bit combination to the second unreachable bit combination may indicate a second characteristic associated with the second populated color plane, and the second characteristic may include the second populated color plane being compressed, and transforming the at least one bit combination may further include transforming a third bit combination associated with a third pixel to a third unreachable bit combination such that transforming the third bit combination associated with the third pixel may include transforming a third bit symbol of the third bit combination, transforming the third bit combination to the third unreachable bit combination may indicate a third characteristic associated with the third populated color plane, and the third characteristic may include the third populated color plane being compressed. The one or more populated color planes may include four populated color planes, a first populated color plane, a second populated color plane, a third populated color plane, and a fourth populated color plane, and transforming the at least one bit combination may include transforming at least one of a first bit combination associated with a first pixel and the first color plane, a second bit combination associated with a second pixel and the second color plane, or a third bit combination associated with a third pixel and the third color plane such that the characteristic may include the populated color plane associated with the transformed bit combination being compressed. The tile of pixels may be 8 pixels wide by 4 pixels high. Each pixel of the tile of pixels may include four color samples. The one or more populated color planes may include four populated color planes. Each bit combination may include 8 bits. The unreachable bit combination may be a bit combination that cannot be reached in standard multi-sampling anti-aliasing processing.

In another example, a system for providing anti-aliasing in graphics rendering on a computer may include a color buffer and a graphics processing unit. The graphics processing unit may include an anti-aliasing compression module. The graphics processing unit may be communicatively coupled to the color buffer and the anti-aliasing compression module may be configured to determine bit combinations for individual pixels of a tile of pixels such that the individual pixels may include two or more color samples within the individual pixels, the bit combinations may indicate one or more indicated color planes of one or more populated color planes, and the one or more populated color planes may be populated with one or more colors associated with the color samples of the individual pixels, transform at least one bit combination of the bit combinations to an unreachable bit combination such that the unreachable bit combination may indicate a characteristic associated with at least one color plane of the one or more color planes, and transfer color data to the color buffer, wherein the color data includes the unreachable bit combination.

In other examples of systems for providing anti-aliasing in graphics rendering on a computer, the system may include a display device. The display device may be configured to display output image data based at least in part on the color data. The anti-aliasing compression module may be further configured to render the tile of pixels, access one or more color planes via a color buffer, and update the one or more color planes to the one or more populated color planes. The characteristic may include at least one of a compression state of the at least one color plane, a compression type of the at least one color plane, or whether the at least one color plane includes cleared color samples. The one or more populated color planes may include a single populated color plane, and transformation of the at least one bit combination may include transformation of each bit symbol of the at least one bit combination such that each bit symbol may be associated with a color sample of the two or more color samples, transformation of each bit symbol may include transformation of each bit symbol from a 00 bit symbol to a 01 bit symbol, and the characteristic comprises the single populated color plane being compressed. The one or more color planes may include two populated color planes, a first populated color plane and a second populated color plane such that the at least one bit combination may be associated with a first pixel, and transformation of the at least one bit combination may include transformation of a first bit symbol of the at least one bit combination, transformation of the first bit symbol may include transformation of the first bit symbol from a 00 bit symbol to a 01 bit symbol, and the characteristic may include the first populated color plane being compressed, wherein transformation of the at least one bit combination may further include transformation of a second bit combination associated with a second pixel to a second unreachable bit combination, and transformation of the second bit combination associated with the second pixel may include transformation of a second bit symbol of the second bit combination such that transformation of the second bit combination to the second unreachable bit combination may indicate a second characteristic associated with the second populated color plane, and the second characteristic may include the second populated color plane being compressed. The one or more populated color planes may include three populated color planes, a first populated color plane, a second populated color plane, and a third populated color plane such that the at least one bit combination may be associated with a first pixel, and transformation of the at least one bit combination may include transformation of a first bit symbol of the at least one bit combination, and the characteristic may include the first populated color plane being compressed, wherein transformation of the at least one bit combination may further include transformation of a second bit combination associated with a second pixel to a second unreachable bit combination, transformation of the second bit combination associated with the second pixel may include transformation of a second bit symbol of the second bit combination, transformation of the second bit combination to the second unreachable bit combination may indicate a second characteristic associated with the second populated color plane, and the second characteristic comprises the second populated color plane being compressed, and transformation of the at least one bit combination may further include transformation of a third bit combination associated with a third pixel to a third unreachable bit combination such that transformation of the third bit combination associated with the third pixel may include transformation of a third bit symbol of the third bit combination, transformation of the third bit combination to the third unreachable bit combination may indicate a third characteristic associated with the third populated color plane, and the third characteristic comprises the third populated color plane being compressed. The one or more populated color planes may include four populated color planes, a first populated color plane, a second populated color plane, a third populated color plane, and a fourth populated color plane, and transformation of the at least one bit combination may include transformation of at least one of a first bit combination associated with a first pixel and the first color plane, a second bit combination associated with a second pixel and the second color plane, or a third bit combination associated with a third pixel and the third color plane such that the characteristic comprises the populated color plane associated with the transformed bit combination being compressed. The tile of pixels may be 8 pixels wide by 4 pixels high. Each pixel of the tile of pixels may include four color samples. The one or more populated color planes may include four populated color planes. Each bit combination may include 8 bits. The unreachable bit combination may be a bit combination that cannot be reached in standard multi-sampling anti-aliasing processing.

In another example, at least one machine readable medium may include a plurality of instructions that in response to being executed on a computing device, cause the computing device to perform the method according to any one of the above examples.

In yet another example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for providing anti-aliasing in graphics rendering comprising:
   determining bit combinations for individual pixels of a tile of pixels, wherein the individual pixels include two or more color samples within the individual pixels, wherein the bit combinations indicate one or more indicated color planes of one or more populated color planes associated with the color samples of the individual pixels, and wherein the one or more populated color planes are populated with one or more colors associated with the color samples of the individual pixels; and
   transforming at least one bit combination of the bit combinations to an unreachable bit combination, wherein the unreachable bit combination indicates a characteristic associated with at least one color plane of the one or more color planes.

2. The method of claim 1, wherein the one or more populated color planes comprise a single populated color plane, wherein transforming the at least one bit combination comprises transforming each bit symbol of the at least one bit combination, and wherein each bit symbol is associated with a color sample of the two or more color samples.

3. The method of claim 1, wherein the one or more color planes comprise two populated color planes, a first populated color plane and a second populated color plane, wherein the at least one bit combination is associated with a first pixel, wherein transforming the at least one bit combination comprises transforming a first bit symbol of the at least one bit combination, wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed.

4. The method of claim 1, wherein the one or more color planes comprise two populated color planes, a first populated color plane and a second populated color plane, wherein the at least one bit combination is associated with a first pixel, wherein transforming the at least one bit combination comprises transforming a first bit symbol of the at least one bit combination, wherein transforming the first bit symbol comprises transforming the first bit symbol from a 00 bit symbol to a 01 bit symbol, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed.

5. The method of claim 1, wherein the one or more populated color planes comprise three populated color planes, a first populated color plane, a second populated color plane, and a third populated color plane, wherein the at least one bit combination is associated with a first pixel, wherein transforming the at least one bit combination comprises transforming a first bit symbol of the at least one bit combination, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed, wherein transforming the at least one bit combination further comprises transforming a third bit combination associated with a third pixel to a third unreachable bit combination, wherein transforming the third bit combination associated with the third pixel comprises transforming a third bit symbol of the third bit combination, wherein transforming the third bit combination to the third unreachable bit combination indicates a third characteristic associated with the third populated color plane, and wherein the third characteristic comprises the third populated color plane being compressed.

6. The method of claim 1, wherein the one or more populated color planes comprise four populated color planes, a first populated color plane, a second populated color plane, a third populated color plane, and a fourth populated color plane, wherein transforming the at least one bit combination comprises transforming at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed.

7. The method of claim 1, wherein the tile of pixels comprises 8 pixels wide by 4 pixels high, wherein each pixel of the tile of pixels comprises four color samples, wherein the one or more populated color planes comprise four populated color planes, and wherein each bit combination comprises 8 bits.

8. The method of claim 1, further comprising:
   transferring color data to a color buffer, wherein the color data comprises the unreachable bit combination.

9. The method of claim 1, wherein the characteristic comprises the at least one color plane being compressed.

10. The method of claim 1, further comprising:
    rendering the tile of pixels;
    accessing one or more color planes via a color buffer;
    updating the one or more color planes to the one or more populated color planes;
    transferring color data comprising the unreachable bit combination to the color buffer;
    detecting the unreachable bit combination;
    determining the characteristic associated with at least one color plane of the one or more color planes based on the unreachable bit combination;
    reverse transforming the unreachable bit combination to a reachable bit combination; and
    determining the two or more color samples based at least in part on the reachable bit combination,
    wherein the characteristic comprises at least one of a compression state of the at least one color plane, a compression type of the at least one color plane, or whether the at least one color plane includes cleared color samples,
    wherein the one or more populated color planes comprise a single populated color plane, wherein transforming the at least one bit combination comprises transforming each bit symbol of the at least one bit combination, wherein each bit symbol is associated with a color sample of the two or more color samples, wherein transforming each bit symbol comprises transforming each bit symbol from a 00 bit symbol to a 01 bit symbol, and wherein the characteristic comprises the single populated color plane being compressed, wherein the one or more color planes comprise two populated color planes, a first populated color plane and a second populated color plane, wherein the at least one bit combination is associated with a first pixel, wherein transforming the at least one bit combination comprises transforming a first bit symbol of the at least one bit combination, wherein transforming the first bit symbol comprises transforming the first bit symbol from a 00 bit symbol to a 01 bit symbol, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed, wherein the one or more populated color planes comprise three populated color planes, a first populated color plane, a second populated color plane, and a third populated color plane, wherein the at least one bit combination is associated with a first pixel, wherein transforming the at least one bit combination comprises transforming a first bit symbol of the at least one bit combination, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed, wherein transforming the at least one bit combination further comprises transforming a third bit combination associated with a third pixel to a third unreachable bit combination, wherein transforming the third bit combination associated with the third pixel comprises transforming a third bit symbol of the third bit combination, wherein transforming the third bit combination to the third unreachable bit combination indicates a third characteristic associated with the third populated color plane, and wherein the third characteristic comprises the third populated color plane being compressed, wherein the one or more populated color planes comprise four populated color planes, a first populated color plane, a second populated color plane, a third populated color plane, and a fourth populated color plane, wherein transforming the at least one bit combination comprises transforming at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed, wherein the tile of pixels comprises 8 pixels wide by 4 pixels high, wherein each pixel of the tile of pixels comprises four color samples, wherein the one or more populated color planes comprise four populated color planes, and wherein each bit combination comprises 8 bits, and wherein the unreachable bit combination comprises a bit combination that cannot be reached in standard multi-sampling anti-aliasing processing.

11. A system for providing anti-aliasing in graphics rendering on a computer, comprising:
a color buffer;
a graphics processing unit comprising an anti-aliasing compression module, wherein the graphics processing unit is communicatively coupled to the color buffer and wherein the anti-aliasing compression module is configured to:
determine bit combinations for individual pixels of a tile of pixels, wherein the individual pixels include two or more color samples within the individual pixels, wherein the bit combinations indicate one or more indicated color planes of one or more populated color planes, and wherein the one or more populated color planes are populated with one or more colors associated with the color samples of the individual pixels;
transform at least one bit combination of the bit combinations to an unreachable bit combination, wherein the unreachable bit combination indicates a characteristic associated with at least one color plane of the one or more color planes; and
transfer color data to the color buffer, wherein the color data includes the unreachable bit combination.

12. The system of claim 11, wherein the characteristic comprises at least one of a compression state of the at least one color plane, a compression type of the at least one color plane, or whether the at least one color plane includes cleared color samples.

13. The system of claim 11, wherein the one or more populated color planes comprise a single populated color plane, wherein transformation of the at least one bit combination comprises transformation of each bit symbol of the at least one bit combination, wherein each bit symbol is associated with a color sample of the two or more color samples, and wherein the characteristic comprises the single populated color plane being compressed.

14. The system of claim 11, wherein the one or more color planes comprise two populated color planes, a first populated color plane and a second populated color plane, wherein the at least one bit combination is associated with a first pixel, wherein transformation of the at least one bit combination comprises transformation of a first bit symbol of the at least one bit combination, and wherein the characteristic comprises the first populated color plane being compressed, wherein transformation of the at least one bit combination further comprises transformation of a second bit combination associated with a second pixel to a second unreachable bit combination, wherein transformation of the second bit combination associated with the second pixel comprises transformation of a second bit symbol of the second bit combination, wherein transformation of the second bit combination to the second unreachable bit combination indicates a second characteristic associated with the second populated color plane, and wherein the second characteristic comprises the second populated color plane being compressed.

15. The system of claim 11, wherein the one or more populated color planes comprise three populated color planes, a first populated color plane, a second populated color plane, and a third populated color plane, wherein the at least one bit combination is associated with a first pixel, wherein transformation of the at least one bit combination comprises transformation of a first bit symbol of the at least one bit combination, and wherein the characteristic comprises the first populated color plane being compressed, wherein transformation of the at least one bit combination further comprises transformation of a second bit combination associated with a second pixel to a second unreachable bit combination, wherein transformation of the second bit combination associated with the second pixel comprises transformation of a second bit symbol of the second bit combination, wherein transformation of the second bit combination to the second unreachable bit combination indicates a second characteristic associated with the second populated color plane, and wherein the second characteristic comprises the second populated color plane being compressed, wherein transformation of the at least one bit combination further comprises transformation of a third bit combination associated with a third pixel to a third unreachable bit combination, wherein transformation of the third bit combination associated with the third pixel comprises transformation of a third bit symbol of the third bit combination, wherein transformation of the third bit combination to the third unreachable bit combination indicates a third characteristic associated with the third populated color plane, and wherein the third characteristic comprises the third populated color plane being compressed.

16. The system of claim 11, wherein the one or more populated color planes comprise four populated color planes, a first populated color plane, a second populated color plane, a third populated color plane, and a fourth populated color plane, wherein transformation of the at least one bit combination comprises transformation of at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed.

17. The system of claim 11, wherein the tile of pixels comprises 8 pixels wide by 4 pixels high, wherein each pixel of the tile of pixels comprises four color samples, wherein the one or more populated color planes comprise four populated color planes, and wherein each bit combination comprises 8 bits.

18. The system of claim 11, further comprising:
a display device configured to display output image data based at least in part on the color data.

19. The system of claim 11, further comprising:
a display device configured to display output image data based at least in part on the color data,
wherein the anti-aliasing compression module is configured to:
render the tile of pixels;
access one or more color planes via a color buffer; and
update the one or more color planes to the one or more populated color planes;
wherein the characteristic comprises at least one of a compression state of the at least one color plane, a compression type of the at least one color plane, or whether the at least one color plane includes cleared color samples,
wherein the one or more populated color planes comprise a single populated color plane, wherein transformation of the at least one bit combination comprises transformation of each bit symbol of the at least one bit combination, wherein each bit symbol is associated with a color sample of the two or more color samples, wherein transformation of each bit symbol comprises transformation of each bit symbol from a 00 bit symbol to a 01 bit symbol, and wherein the characteristic comprises the single populated color plane being compressed,
wherein the one or more color planes comprise two populated color planes, a first populated color plane and a second populated color plane, wherein the at least one bit combination is associated with a first pixel, wherein transformation of the at least one bit combination comprises transformation of a first bit symbol of the at least one bit combination, wherein transformation of the first bit symbol comprises transformation of the first bit symbol from a 00 bit symbol to a 01 bit symbol, and wherein the characteristic comprises the first populated color plane being compressed, wherein transformation of the at least one bit combination further comprises transformation of a second bit combination associated with a second pixel to a second unreachable bit combination, wherein transformation of the second bit combination associated with the second pixel comprises transformation of a second bit symbol of the second bit combination, wherein transformation of the second bit combination to the second unreachable bit combination indicates a second characteristic associated with the second populated color plane, and wherein the second characteristic comprises the second populated color plane being compressed,
wherein the one or more populated color planes comprise three populated color planes, a first populated color plane, a second populated color plane, and a third populated color plane, wherein the at least one bit combination is associated with a first pixel, wherein transformation of the at least one bit combination comprises transformation of a first bit symbol of the at least one bit combination, and wherein the characteristic comprises the first populated color plane being compressed, wherein transformation of the at least one bit combination further comprises transformation of a second bit combination associated with a second pixel to a second unreachable bit combination, wherein transformation of the second bit combination associated with the second pixel comprises transformation of a second bit symbol of the second bit combination, wherein transformation of the second bit combination to the second unreachable bit combination indicates a second characteristic associated with the second populated color plane, and wherein the second characteristic comprises the second populated color plane being compressed, wherein transformation of the at least one bit combination further comprises transformation of a third bit combination associated with a third pixel to a third unreachable bit combination, wherein transformation of the third bit combination associated with the third pixel comprises transformation of a third bit symbol of the third bit combination, wherein transformation of the third bit combination to the third unreachable bit combination indicates a third characteristic associated with the third populated color plane, and wherein the third characteristic comprises the third populated color plane being compressed, wherein the one or more populated color planes comprise four populated color planes, a first populated color plane, a second populated color plane, a third populated color plane, and a fourth populated color plane, wherein transformation of the at least one bit combination comprises transformation of at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed, wherein the tile of pixels comprises 8 pixels wide by 4 pixels high, wherein each pixel of the tile of pixels comprises four color samples, wherein the one or more populated color planes comprise four populated color planes, and wherein each bit combination comprises 8 bits, and wherein the unreachable bit combination comprises a bit combination that cannot be reached in standard multi-sampling anti-aliasing processing.

20. At least one non-transitory machine readable medium comprising a plurality of instructions that in response to being executed on a computing device, cause the computing device to provide anti-aliasing in graphics rendering by:
   determining bit combinations for individual pixels of a tile of pixels, wherein the individual pixels include two or more color samples within the individual pixels, wherein the bit combinations indicate one or more indicated color planes of one or more populated color planes associated with the color samples of the individual pixels, and wherein the one or more populated color planes are populated with one or more colors associated with the color samples of the individual pixels; and
   transforming at least one bit combination of the bit combinations to an unreachable bit combination, wherein the unreachable bit combination indicates a characteristic associated with at least one color plane of the one or more color planes.

21. The non-transitory machine readable medium of claim 20, wherein the one or more populated color planes comprise a single populated color plane, wherein transforming the at least one bit combination comprises transforming each bit symbol of the at least one bit combination, and wherein each bit symbol is associated with a color sample of the two or more color samples.

22. The non-transitory machine readable medium of claim 20, wherein the one or more color planes comprise two populated color planes, a first populated color plane and a second populated color plane, wherein the at least one bit combination is associated with a first pixel, wherein transforming the at least one bit combination comprises transforming a first bit symbol of the at least one bit combination, wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed.

23. The non-transitory machine readable medium of claim 20, wherein the one or more populated color planes comprise four populated color planes, a first populated color plane, a second populated color plane, a third populated color plane, and a fourth populated color plane, wherein transforming the at least one bit combination comprises transforming at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed.

24. The non-transitory machine readable medium of claim 20, further comprising instructions that in response to being executed on the computing device, cause the computing device to provide anti-aliasing in graphics rendering by:
   rendering the tile of pixels;
   accessing one or more color planes via a color buffer;
   updating the one or more color planes to the one or more populated color planes;
   transferring color data comprising the unreachable bit combination to the color buffer;
   wherein the characteristic comprises at least one of a compression state of the at least one color plane, a compression type of the at least one color plane, or whether the at least one color plane includes cleared color samples,
   wherein the one or more populated color planes comprise a single populated color plane, wherein transforming the at least one bit combination comprises transforming each bit symbol of the at least one bit combination, wherein each bit symbol is associated with a color sample of the two or more color samples, wherein transforming each bit symbol comprises transforming each bit symbol from a 00 bit symbol to a 01 bit symbol, and wherein the characteristic comprises the single populated color plane being compressed,
   wherein the one or more color planes comprise two populated color planes, a first populated color plane and a second populated color plane, wherein the at least one bit combination is associated with a first pixel, wherein transforming the at least one bit combination comprises transforming a first bit symbol of the at least one bit combination, wherein transforming the first bit symbol comprises transforming the first bit symbol from a 00 bit symbol to a 01 bit symbol, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed,
   wherein the one or more populated color planes comprise three populated color planes, a first populated color plane, a second populated color plane, and a third populated color plane, wherein the at least one bit combination is associated with a first pixel, wherein transforming the at least one bit combination comprises transforming a first bit symbol of the at least one bit combination, and wherein the characteristic comprises the first populated color plane being compressed, wherein transforming the at least one bit combination further comprises transforming a second bit combination associated with a second pixel to a second unreachable bit combination, wherein transforming the second bit combination associated with the second pixel comprises transforming a second bit symbol of the second bit combination, wherein transforming the second bit combination to the second unreachable bit combination indicates a second characteristic associated with the second populated color plane, and wherein the second characteristic comprises the second populated color plane being compressed, wherein transforming the at least one bit combination further comprises transforming a third bit combination associated with a third pixel to a third unreachable bit combination, wherein transforming the third bit combination associated with the third pixel comprises transforming a third bit symbol of the third bit combination, wherein transforming the third bit combination to the third unreachable bit combination indicates a third characteristic associated with the third populated color plane, and wherein the third characteristic comprises the third populated color plane being compressed, wherein the one or more populated color planes comprise four populated color planes, a first populated color plane, a second populated color plane, a third populated color plane, and a fourth populated color plane, wherein transforming the at least one bit combination comprises transforming at least one of a first bit combination associated with a first pixel and the first color plane, a second bit combination associated with a second pixel and the second color plane, or a third bit combination associated with a third pixel and the third color plane, and wherein the characteristic comprises the populated color plane associated with the transformed bit combination being compressed, wherein the tile of pixels comprises 8 pixels wide by 4 pixels high, wherein each pixel of the tile of pixels comprises four color samples, wherein the one or more populated color planes comprise four populated color planes, and wherein each bit combination comprises 8 bits, and wherein the unreachable bit combination comprises a bit combination that cannot be reached in standard multi-sampling anti-aliasing processing.

\* \* \* \* \*